(12) United States Patent
Inagaki et al.

(10) Patent No.: US 8,721,304 B2
(45) Date of Patent: May 13, 2014

(54) SEALED COMPRESSOR

(75) Inventors: Ko Inagaki, Shiga (JP); Yu Haraki, Shiga (JP); Hidenori Kobayashi, Shiga (JP); Tsuyoshi Matsumoto, Shiga (JP); Yasushi Hayashi, Shiga (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 13/119,380

(22) PCT Filed: Oct. 23, 2009

(86) PCT No.: PCT/JP2009/005586
§ 371 (c)(1),
(2), (4) Date: Mar. 16, 2011

(87) PCT Pub. No.: WO2010/050163
PCT Pub. Date: Jun. 5, 2010

(65) Prior Publication Data
US 2011/0200462 A1 Aug. 18, 2011

(30) Foreign Application Priority Data

Oct. 27, 2008 (JP) ................................ 2008-275124
Nov. 6, 2008 (JP) ................................ 2008-285139

(51) Int. Cl.
*F04B 17/03* (2006.01)

(52) U.S. Cl.
USPC ............................ 417/415; 384/611; 384/620

(58) Field of Classification Search
USPC ......... 384/215, 231, 609, 611, 615, 618, 620, 384/622; 417/312, 415, 423.12, 902
See application file for complete search history.

(56) References Cited

U.S. PATENT DOCUMENTS

| | | | |
|---|---|---|---|
| 4,828,403 A | 5/1989 | Schwartzman | |
| 4,883,413 A | 11/1989 | Perevuznik et al. | |
| 5,813,314 A * | 9/1998 | Michiyuki et al. | 92/71 |
| 5,967,674 A * | 10/1999 | Reubelt et al. | 384/620 |
| 6,338,613 B1 * | 1/2002 | Okuno et al. | 417/222.2 |
| 6,948,418 B2 * | 9/2005 | Kim | 92/140 |
| 7,137,791 B2 * | 11/2006 | Manke et al. | 417/415 |
| 7,497,627 B2 * | 3/2009 | Saville et al. | 384/105 |
| 2004/0146337 A1 * | 7/2004 | Zuge et al. | 403/135 |
| 2004/0221716 A1 | 11/2004 | Kim | |
| 2005/0089416 A1 * | 4/2005 | Lee | 417/415 |
| 2007/0058895 A1 * | 3/2007 | Paschoalino | 384/617 |
| 2009/0136369 A1 * | 5/2009 | Kakiuchi et al. | 417/410.1 |

FOREIGN PATENT DOCUMENTS

| | | |
|---|---|---|
| CN | 1963198 A | 5/2007 |
| EP | 0298315 A1 | 1/1989 |
| JP | 64-024192 A | 1/1989 |
| JP | 64-065329 A | 3/1989 |

(Continued)

OTHER PUBLICATIONS

International Search Report for International Application No. PCT/JP2009/005586, dated Jan. 19, 2010, 4 pages.

*Primary Examiner* — Devon Kramer
*Assistant Examiner* — Charles W Nichols
(74) *Attorney, Agent, or Firm* — Brinks Gilson & Lione

(57) ABSTRACT

A hermetic compressor includes a thrust ball bearing (176) on the thrust face (160) of the main bearing (126). The thrust ball bearing (176) includes balls (166) held in a holder (168), an upper race (164) and a lower race (170) arranged respectively on and beneath the balls (166), and an elastic support member (172) below the balls (166). The hermetic compressor is prevented from causing a load to be applied unevenly to the balls (166), thereby achieving high efficiency, low noise level, and high reliability.

19 Claims, 18 Drawing Sheets

(56) References Cited

FOREIGN PATENT DOCUMENTS

| | | |
|---|---|---|
| JP | 01-211670 A | 8/1989 |
| JP | 08-319942 A | 12/1996 |
| JP | 2000-304055 A | 10/2000 |
| JP | 2002-195274 A | 7/2002 |
| JP | 2004-332711 A | 11/2004 |
| JP | 2005-500476 A | 1/2005 |
| JP | 2005-127305 A | 5/2005 |
| JP | 2007-132260 A | 5/2007 |
| JP | 2008-002371 A | 1/2008 |
| WO | WO 03/029654 A1 | 4/2003 |

\* cited by examiner

SEALED COMPRESSOR

This application is a 371 application of PCT/JP2009/005586 having an international filing date of Oct. 23, 2009, which claims priority to JP2008-275124 filed on Oct. 27, 2008 and JP2008-285139 filed on Nov. 6, 2008, the entire contents of which are incorporated herein by reference.

TECHNICAL FIELD

The present invention relates to a hermetic compressor in the refrigeration cycle mainly of electric fridge-freezers.

BACKGROUND ART

In some of the conventional compressors using a thrust ball bearing, a rolling bearing is placed around a tubular extension portion in the upper part of the main bearing (see, for example, Patent Literature 1).

The conventional hermetic compressor disclosed in Patent Literature 1 will be described as follows with reference to the accompanied drawings. FIG. 16 is a longitudinal sectional view of the hermetic compressor of Patent Literature 1. FIG. 17 is an enlarged view of an essential part of a thrust ball bearing in the compressor. FIG. 18 is a perspective view of a support member in the compressor.

In FIG. 16, the compressor includes airtight container 2 having lubricating oil 4 at its bottom. Airtight container 2 includes compressor body 6 resiliently supported by suspension springs 8.

Compressor body 6 includes motor element 10 and compression element 12 arranged above it. Motor element 10 includes stator 14 and rotor 16.

Compression element 12 includes shaft 18 and cylinder block 24. Shaft 18 includes main shaft 20 and eccentric shaft 22. Main shaft 20, to which rotor 16 is fixed, is rotatably supported by main bearing 26 of cylinder block 24. A load applied to eccentric shaft 22 is supported by the eccentric-shaft-side portions of main shaft 20 and main bearing 26 arranged below eccentric shaft 22 so as to form a cantilever bearing.

Shaft 18 has lubrication mechanism 28 including a spiral groove on the surface of main shaft 20.

Compression element 12 further includes piston 30, which reciprocates in cylinder 34 having a substantially cylindrical inner surface in cylinder block 24. Compression element 12 further includes connection portion 36 having holes at its ends. Into these holes are fitted piston pin 38 of piston 30 and eccentric shaft 22 so as to connect eccentric shaft 22 and piston 30.

Cylinder 34 and piston 30 form compression space 48 together with valve plate 46, which is arranged on the open end face of cylinder 34. Valve plate 46 is covered with fixed cylinder head 50.

Cylinder head 50 is equipped with intake muffler 52, which is molded with a resin such as PBT (polybutylene terephthalate) in such a manner as to have a sound absorbing space inside.

The following is a description of a thrust ball bearing. In FIG. 17, main bearing 26 includes thrust face 60 and tubular extension portion 62. Thrust face 60 is a planar portion perpendicular to the central axis. Tubular extension portion 62 extends upward beyond thrust face 60 and has an inner surface facing main shaft 20.

Thrust ball bearing 76, which includes upper race 64, balls 66 held by holder 68, lower race 70, and support member 72, is formed on the outer-diameter side of tubular extension portion 62.

Upper and lower races 64 and 70 are annular metal plates each having parallel top and bottom sides. Holder 68 is annular in shape and has a plurality of holes in the circumferential direction in which balls 66 are held rotably.

As shown in FIG. 18, support member 72 includes an annular metal plate having downside projections 72a and 72b and upside projections 72c and 72d. These projections are formed of curved surfaces having the same radius, and arranged in such a manner that the line connecting the peaks of downside projections 72a and 72b and the line connecting the peaks of upside projections 72c and 72d are at right angles to each other.

On thrust face 60 are support member 72, lower race 70, balls 66, and upper race 64 arranged in contact with each other in this order. On the top surface of upper race 64, there is placed flange 74 of shaft 18. In support member 72, downside projections 72a and 72b are in line contact with thrust face 60, and upside projections 72c and 72d are in line contact with lower race 70.

The compressor having the above-described structure operates as follows. When electric power is supplied to motor element 10, stator 14 generates a rotating magnetic field, which allows rotor 16 to rotate with main shaft 20. The rotation of main shaft 20 makes eccentric shaft 22 perform eccentric rotation, which is transmitted to piston 30 via connection portion 36, allowing piston 30 to reciprocate in cylinder 34.

A refrigerant returned from a refrigeration cycle (not shown) outside airtight container 2 is introduced into compression space 48 via intake muffler 52, compressed by piston 30 therein, and sent from airtight container 2 to the refrigeration cycle (not shown).

The bottom of shaft 18 is soaked in lubricating oil 4, so that the rotation of shaft 18 allows lubricating oil 4 to be supplied to each unit of compression element 12 so as to lubricate the sliding part by lubrication mechanism 28.

The following is a description of thrust ball bearing 76. Thrust ball bearing 76 is a rolling bearing in which balls 66 are made to roll while being in point contact with upper and lower races 64 and 70. The rolling bearing can rotate while supporting the vertical load such as the weights of shaft 18 and rotor 16. Thrust rolling bearings have been increasingly used in recent years to achieve efficiency improvement because of less friction than generally-used thrust slide bearings.

In the cantilever bearing as shown in Patent Literature 1, however, when a large external force such as vibration during transportation is applied to the hermetic compressor, thrust ball bearing 76 is subjected to a large load, causing plastic deformation such as sinking in the contact area between balls 66 and upper and lower races 64 and 70. The deformation adversely affects the efficiency, noise level, and reliability.

Another example of thrust ball bearing 76 shown in FIG. 19 is disclosed in Patent Literature 2. FIG. 19 is an exploded perspective view of a thrust ball bearing of another conventional hermetic compressor, which is disclosed in Patent Literature 2. The overall structure of this hermetic compressor will be described with reference to FIG. 16 for convenience.

In FIGS. 16 and 19, on the main shaft 20 side between main shaft 20 and eccentric shaft 22 of shaft 18, there is provided an upper race seating surface (not shown). The upper race seating surface is annular in shape and substantially perpendicular to the central axis of main shaft 20. On the upper end of main bearing 26, there is provided lower race seating surface 80, which is annular in shape and substantially perpendicular to the central axis of main bearing 26. Between the upper race seating surface and lower race seating surface 80, thrust ball bearing 76 is provided which includes balls 66, and upper and lower races 64 and 70 in order to support shaft 18. Upper and lower races 64 and 70 are planar.

Thrust ball bearing 76 having the above-described structure supports the weights of shaft 18 and rotor 16 in the same manner as thrust ball bearing 76 in Patent Literature 1. The rotation of shaft 18 is made smooth by balls 66 rolling between upper and lower races 64 and 70.

During the rotation, upper race 64 rotates together with the upper race seating surface in contact therewith, and lower race 70 is at a standstill in contact with lower race seating surface 80. Using this thrust ball bearing 76 can reduce the loss of the thrust bearing because the torque to rotate shaft 18 is smaller than in a thrust slide bearing. As a result, motor element 10 requires less power, making the hermetic compressor efficient.

In the conventional structure of Patent Literature 2, however, compressors designed to meet the same specification may have variations in noise level and efficiency. A dismantling investigation of a hermetic compressor having a particularly high noise level has revealed that part of upper and lower races 64 and 70 is about to be peeled.

Such peeling is found to be caused as follows. When a compressive load is applied to piston 30 in the compression stroke, the compressive load is also applied to eccentric shaft 22 of shaft 18, which is connected to connection portion 36 via piston pin 38. As a result, shaft 18 is inclined in the clearance between main shaft 20 and main bearing 26 in cylinder block 24.

This prevents upper and lower races 64 and 70 from being parallel with each other, so that the space to hold balls 66 becomes non-uniform, causing the load to be concentrated only on balls 66 passing through a narrow portion of the space, instead of being applied evenly to all balls 66. As a result, balls 66, and upper and lower races 64 and 70 are subjected to excessive repeated stress, and hence, to damage such as fatigue peeling. This may lead to an increase in the noise level, thereby decreasing the efficiency and reliability.

Patent Literature 1: Japanese Translation of PCT Publication No. 2005-500476
Patent Literature 2: Japanese Patent Unexamined Publication No. 2005-127305

SUMMARY OF THE INVENTION

To solve the aforementioned conventional problems, the present invention is directed to provide a hermetic compressor which is prevented from causing a load to be applied unevenly to the balls, and hence from generating an uneven contact load that adversely affects the efficiency, noise level, and reliability.

The hermetic compressor of the present invention includes an airtight container including: a motor element having a stator and a rotor; a compression element driven by the motor element; and lubricating oil for lubricating the compression element. The compression element includes: a shaft having a main shaft and an eccentric shaft, the rotor being fixed to the main shaft; a cylinder block having a compression space; a piston reciprocating in the compression space; a connection portion connecting the piston and the eccentric shaft; a main bearing in the cylinder block, the main bearing supporting the main shaft; and a thrust rolling bearing on a thrust face of the main bearing. The thrust rolling bearing includes: a plurality of rolling elements held in a holder; a upper race and a lower race arranged respectively on and beneath the rolling elements; and a support mechanism below the rolling elements, the support mechanism being elastic.

With this structure, the compressor including an elastic support mechanism below the rolling elements prevents a load from being applied unevenly to the rolling elements. As a result, the hermetic compressor of the present invention is prevented from generating an uneven contact load which adversely affects the efficiency, noise level, and reliability, unlike the conventional compressors.

DETAILED DESCRIPTION OF PREFERRED EMBODIMENTS

Exemplary embodiments of the present invention will be described as follows with reference to drawings. Note, however, that the present invention is not limited to these exemplary embodiments.

First Exemplary Embodiment

Figure 1:
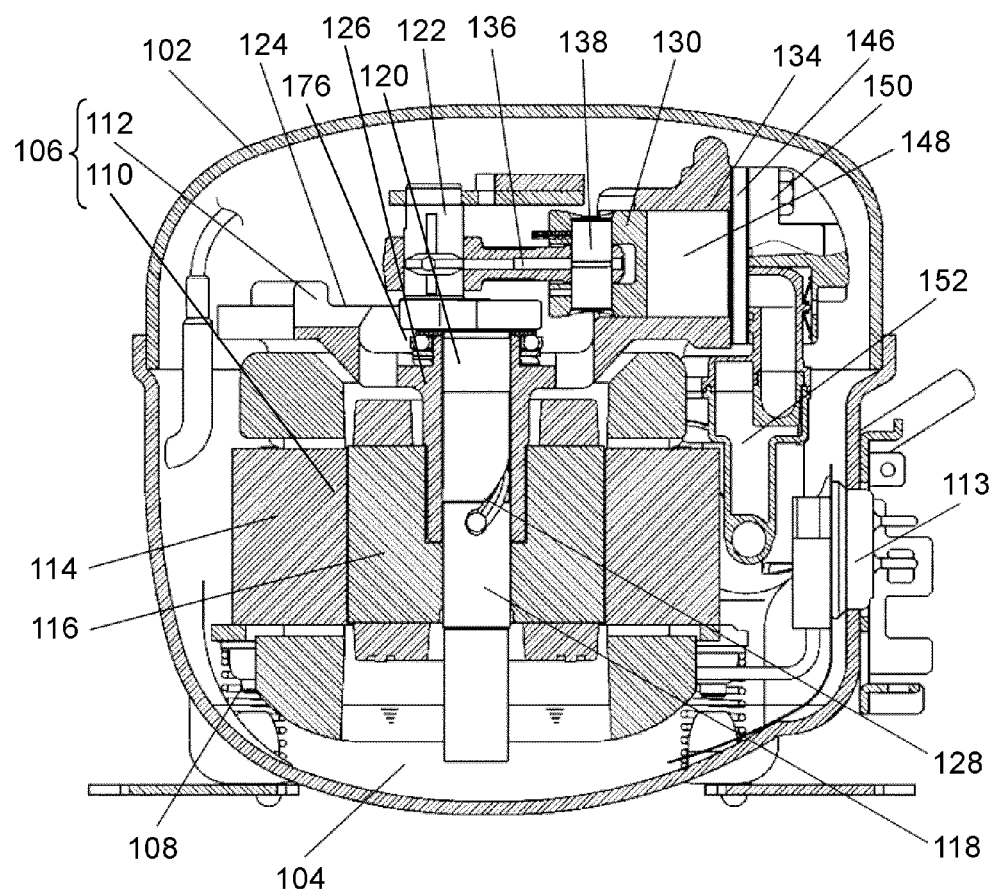
FIG. 1 is a longitudinal sectional view of a hermetic compressor according to a first exemplary embodiment of the present invention.
Figure 2:
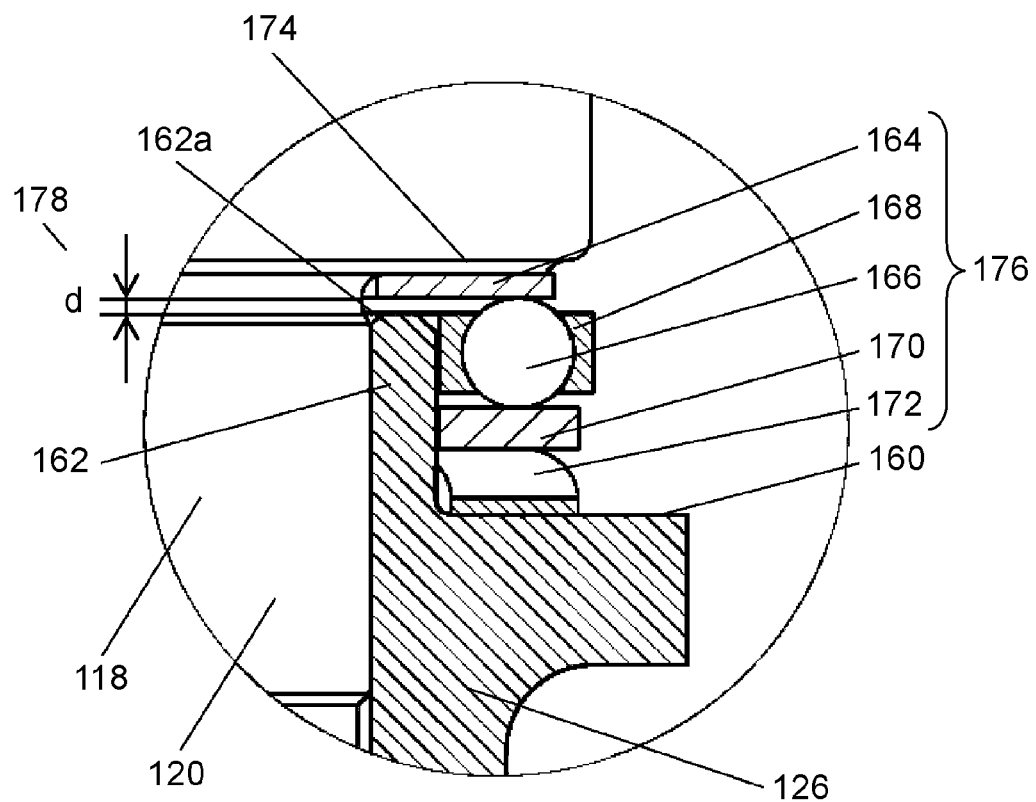
FIG. 2 is an enlarged view of an essential part of a thrust ball bearing in the hermetic compressor according to the first exemplary embodiment.
Figure 3A:
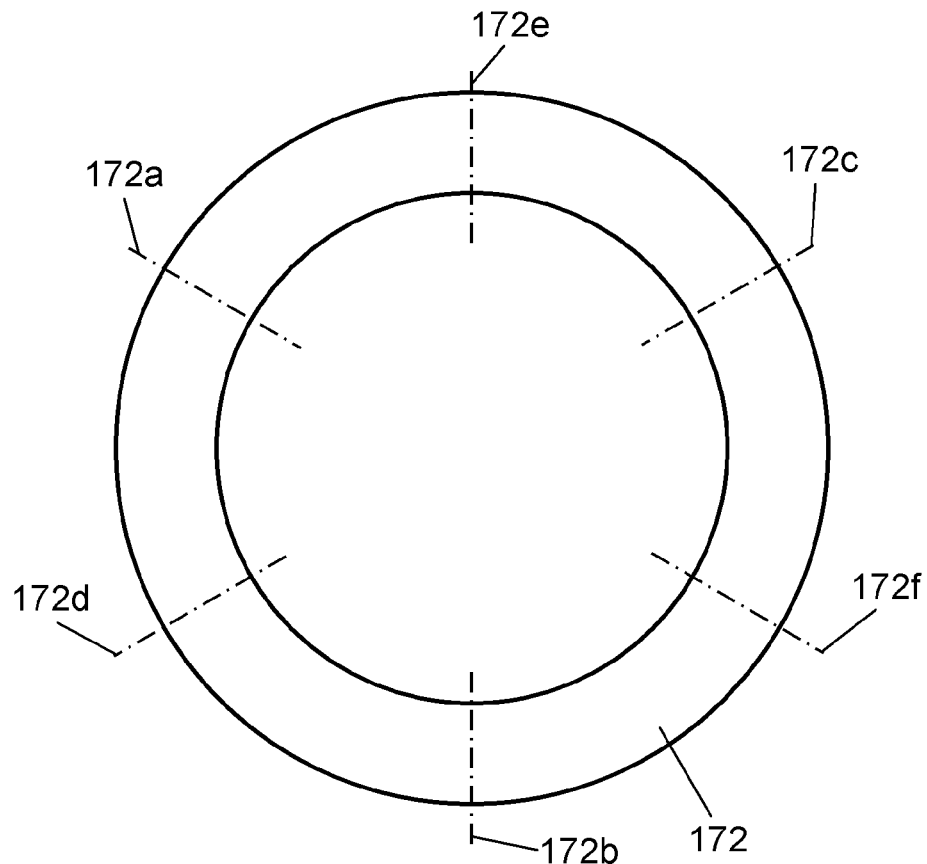
FIG. 3A is a top view of a support member in the hermetic compressor according to the first exemplary embodiment.
Figure 3B:
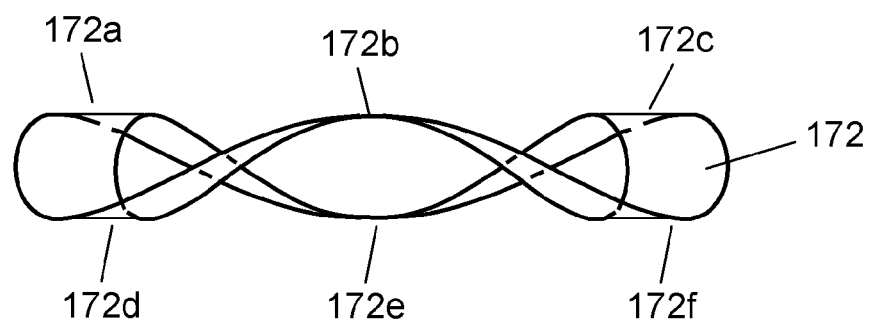
FIG. 3B a side view of the support member in hermetic compressor according to the first exemplary embodiment.

FIG. 1 is a longitudinal sectional view of a hermetic compressor according to a first exemplary embodiment of the present invention. FIG. 2 is an enlarged view of an essential part of a thrust ball bearing in the compressor. FIG. 3A is a top view of a support member in the compressor. FIG. 3B is a side view of the support member in the compressor.

In FIGS. 1 and 2, the hermetic compressor of the present exemplary embodiment includes airtight container 102 having compressor body 106, which is suspended by suspension springs 108. Airtight container 102 has lubricating oil 104 at its bottom, and is filled with R600a (isobutane), which is a refrigerant having a low global warming potential.

Compressor body 106 includes motor element 110 and compression element 112 driven thereby. Airtight container 102 is provided with power supply terminal 113 through which electric power is supplied to motor element 110.

First, motor element 110 is described as follows. Motor element 110 includes stator 114 and rotor 116. Stator 114 is formed of a copper winding, which is wound around a laminated iron core. Rotor 116 is arranged on the inner-diameter side of stator 114. The winding of stator 114 is connected, passing through power supply terminal 113, to an electric power supply (not shown) outside the compressor via a conductive wire.

Next, compression element 112 is described as follows. Compression element 112 is arranged above motor element 110, and includes shaft 118 having main shaft 120 and eccentric shaft 122 parallel to each other. Rotor 116 is fixed to main shaft 120.

Compression element 112 further includes cylinder block 124, which has main bearing 126 having a cylindrical inner surface. Main shaft 120 is rotatably supported in and by main bearing 126. In compression element 112, a load applied to eccentric shaft 122 is supported by the eccentric-shaft-side portions of main shaft 120 and main bearing 126 arranged below eccentric shaft 122 so as to form a cantilever bearing.

Shaft 118 has lubrication mechanism 128 including a spiral groove on the surface of main shaft 120. Cylinder block 124 further includes cylinder 134 having a cylindrical hole, and piston 130 reciprocating in cylinder 134.

Compression element 112 further includes connection portion 136 having holes at its ends. Into these holes are fitted piston pin 138 of piston 130 and eccentric shaft 122 so as to connect eccentric shaft 122 and piston 130.

Cylinder 134 and piston 130 form compression space 148 together with valve plate 146, which is arranged on the end face of cylinder 134. Valve plate 146 is covered with fixed cylinder head 150.

Cylinder head 150 is equipped with intake muffler 152, which is molded with a resin such as PBT (polybutylene terephthalate) in such a manner as to have a sound absorbing space inside.

The following is a description of thrust ball bearing 176, which is a kind of thrust rolling bearing. In FIGS. 1 and 2, thrust ball bearing 176 is arranged on thrust face 160 of main bearing 126. Main bearing 126 includes thrust face 160 and tubular extension portion 162. Thrust face 160 is a planar portion perpendicular to the central axis. Tubular extension portion 162 extends upward beyond thrust face 160 and has an inner surface facing main shaft 120.

Above tubular extension portion 162, there is provided upper race 164. On the outer-diameter side of tubular extension portion 162 and below upper race 164, there are provided balls 166 held as rolling elements in holder 168, lower race 170, and support member 172. Upper race 164, balls 166, holder 168, lower race 170, and support member 172 together form thrust ball bearing 176. In the present exemplary embodiment, the support mechanism is composed of support member 172.

Upper and lower races 164 and 170 are annular metal plates, and are preferably made of heat-treated spring steel. These metal plates have parallel top and bottom sides each having a finished surface. Holder 168 is annular in shape and made of a resin such as polyamide, and has a plurality of holes in which balls 166 are held rotably.

As shown in FIGS. 3A and 3B, support member 172 is an annular wave washer molded from a steel plate for springs. Support member 172 includes three upward projections 172a, 172b, and 172c, and three downward projections 172d, 172e, and 172f. Upward projections 172a, 172b, and 172c and downward projections 172d, 172e, and 172f are alternated in the circumferential direction, and are connected by smooth curves.

On thrust face 160 are support member 172, lower race 170, balls 166, and upper race 164 arranged in contact with each other in this order. On the top surface of upper race 164, there is placed flange 174 of shaft 118.

Thus, support member 172 is in contact with thrust face 160 at three downward projections 172d, 172e, and 172f, and is in contact with lower race 170 at three upward projections 172a, 172b, and 172c.

When thrust ball bearing 176 is mounted on the hermetic compressor, support member 172 is subjected to the load such as the weights of shaft 118 and rotor 116 via lower race 170. Support member 172 is further subjected to the thrust force in the axial direction of motor element 110 during the operation of the compressor. Support member 172 has spring characteristics in the direction of gravity, and therefore, is made lower in height than its natural length by this load. Each dimension and the spring constant of support member 172 are determined in such a manner that upper race 164 and end 162a of tubular extension portion 162 have a gap "d" therebetween in this condition.

Upper race 164 and end 162a of tubular extension portion 162, which face with each other with the gap "d" therebetween form movement restriction part 178.

The gap "d" is also determined in such a manner that the spring force when support member 172 is deformed from the initial state to the extent corresponding to the gap "d" is smaller than the withstand load of thrust ball bearing 176.

When support member 172 is subjected to an eccentric load, the portion of support member 172 that is applied with a large load has a large downward displacement, and the remaining portion has a small displacement. Therefore, lower race 170 on support member 172 can be inclined according to the direction of the load.

The hermetic compressor having the above-described structure operates as follows. When electric power is supplied to motor element 110 through power supply terminal 113, stator 114 generates a magnetic field, which allows rotor 116 to rotate with shaft 118. The rotation of main shaft 120 makes eccentric shaft 122 perform eccentric rotation, which is converted by connection portion 136 so as to allow piston 130 to reciprocate in cylinder 134. Compression space 148 volumetrically changes so as to perform a compression operation in which the refrigerant is suctioned from airtight container 102 and then compressed.

In the intake stroke in the compression operation, the refrigerant in airtight container 102 is intermittently suctioned into compression space 148 through intake muffler 152, and compressed therein. After compressed, the high-temperature, high-pressure refrigerant is sent from airtight container 102 to the refrigeration cycle (not shown) through a discharge pipe or the like.

The bottom of shaft 118 is soaked in lubricating oil 104, so that the rotation of shaft 118 allows lubricating oil 104 to be supplied to each unit of compression element 112 so as to lubricate the sliding part by lubrication mechanism 128.

The following is a description of thrust ball bearing 176. In thrust ball bearing 176, balls 166 of the same size are made to roll between flat upper and lower races 164 and 170 in point contact therewith so as to reduce friction to a low level. This reduces the sliding loss, thereby improving the efficiency of the compressor.

The load applied to thrust ball bearing 176 is the mass of shaft 118 or rotor 116, and the thrust force in the axial direction of motor element 110. The magnitude of the load is as small as 10 to 20 N in a hermetic compressor in an ordinary refrigerator.

In general, the contact load between the balls and the races of a ball bearing has an optimum value. When the contact load is too small, the frictional force between the balls and the races is not enough, causing slipping, and hence, damaging the surface of the contact area. When the contact load is too large, on the other hand, the contact points between the balls and the races have a large stress, causing fatigue fracture of the contact area. When the contact load is extremely large, plastic deformation can occur.

Therefore, in order to achieve the optimum contact load, the dimension values of the balls such as their diameter and number are determined according to the load conditions. When the contact load greatly deviates from the designed load conditions, that causes problems such as a significant decrease in the life of the compressor. The contact load between balls 166 and the races can greatly deviate from the design in the following two cases.

The first case is when upper and lower races 164 and 170 cannot be kept in parallel with each other. More specifically, in a cantilever bearing, shaft 118 may be slightly inclined in the clearance between main shaft 120 and main bearing 126 by a compression load. Even such a slight inclination can cause the contact between balls 166 and upper and lower races 164 and 170 to be non-uniform.

Support member 172, however, can incline lower race 170 thereon in an arbitrary direction with respect to thrust face 160, and hence, maintain upper and lower races 164 and 170 in parallel relationship. This equalizes the load on all balls 166, preventing some of the balls 166 from being subjected to a larger or smaller load than the others, thereby preventing the compressor from having a shorter life.

The second case is when the compressor is subjected to an external force. This is, for example, when an impulsive load such as vibration during transportation is applied to thrust ball bearing 176. In this case, support member 172 is deformed because of being elastic in the direction of gravity. This reduces the increase in the load on the contact area between balls 166 and upper and lower races 164 and 170, thereby preventing the contact area from being subjected to plastic deformation such as sinking.

With an increase in the downward displacement of shaft 118, and hence in the deformation of support member 172, the load on the contact area between balls 166 and upper and lower races 164 and 170 also increases gradually. When the amount of displacement becomes equal to the gap "d" between upper race 164 and end 162a of tubular extension portion 162, support member 172 is not deformed any more. This is because of the presence of movement restriction part 178, which is formed by the contact between upper race 164 and end 162a of tubular extension portion 162. As a result, the load on the contact area between balls 166 and upper and lower races 164 and 170 is not increased any more either.

Furthermore, the spring force of support member 172 when deformed to an extent corresponding to the gap "d" is made smaller than the withstand load of thrust ball bearing 176. This ensures the prevention of the breakage of thrust ball bearing 176.

Thus, movement restriction part 178 functions before a load exceeding the withstand load is applied to thrust ball bearing 176.

As described hereinbefore, according to the present exemplary embodiment, the presence of support member 172 allows the contact load between balls 166 and upper and lower races 164 and 170 to be within the optimum range even when the load is biased by the inclination of shaft. 118, or is increased by an external force applied to thrust ball bearing 176. As a result, the contact area between balls 166 and upper and lower races 164 and 170 is prevented from wear or plastic deformation, thereby maintaining good sliding condition and reliability. The excellent maintenance of the sliding condition of thrust ball bearing 176 reduces friction and keeps good performance.

Furthermore, the surface of the contact area between balls 166 and upper and lower races 164 and 170 is prevented from damage, and a low noise level is maintained by preventing noise and vibration, which is caused when the contact load is unstable.

In the present exemplary embodiment, three upward projections 172a, 172b, and 172c, and three downward projections 172d, 172e, and 172f are provided. Alternatively, four or more upward projections and four or more downward projections may be provided to obtain the same effect.

The support member is a wave washer formed of a single plate in the present exemplary embodiment, but may alternatively be formed of a plurality of wave washer members stacked on each other to meet the magnitude of the required load. In this case, when the thrust load is large, a comparatively small support member formed of a plurality of wave washer members having relatively large rigidity can be used to maintain upper and lower races 164 and 170 in parallel relationship.

The thrust rolling bearing on thrust face 160 is thrust ball bearing 176 in the present exemplary embodiment, but may alternatively be other type of rolling bearing such as the one with rollers so as to provide the same effect.

Compression element 112 is arranged above motor element 110 in the present exemplary embodiment, but may alternatively be arranged below it. In this case, thrust ball bearing 176 is generally arranged between rotor 116 and the upper end of main bearing 126, whereas support member 172 is generally arranged between lower race 170 and thrust face 160.

Second Exemplary Embodiment

Figure 4:
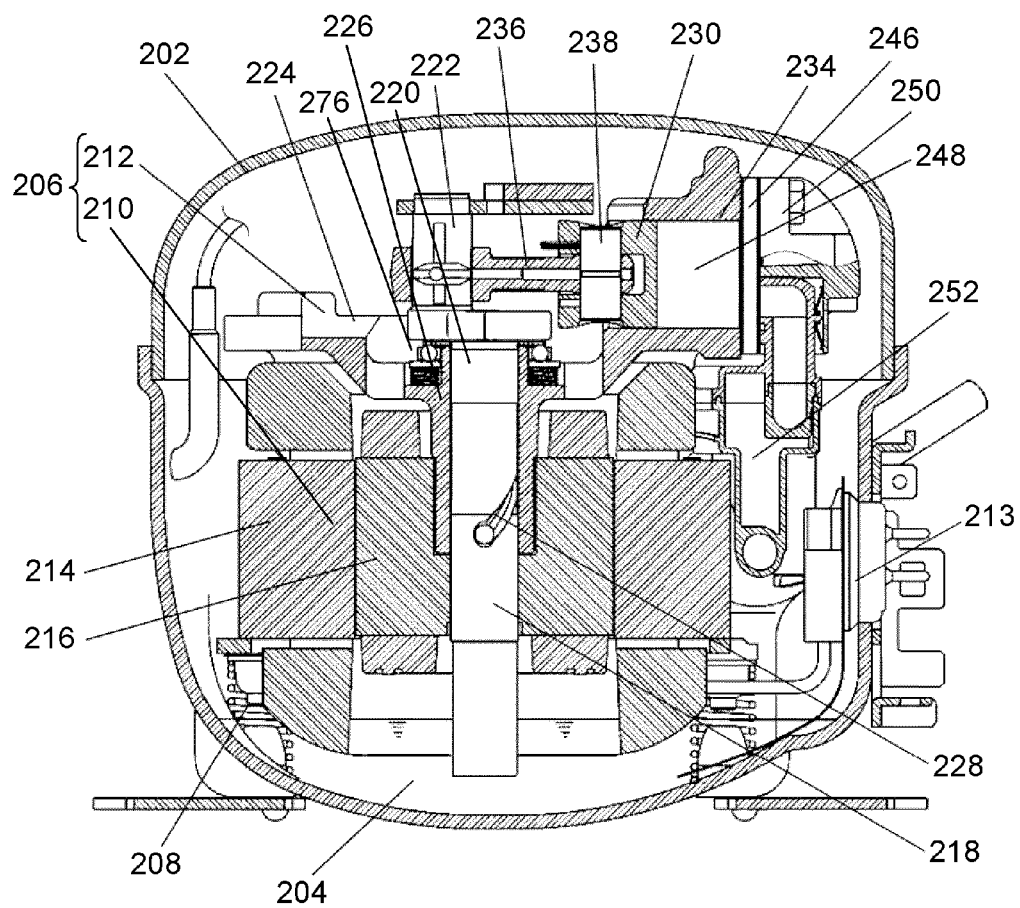
FIG. 4 is a longitudinal sectional view of a hermetic compressor according to a second exemplary embodiment of the present invention.
Figure 5:
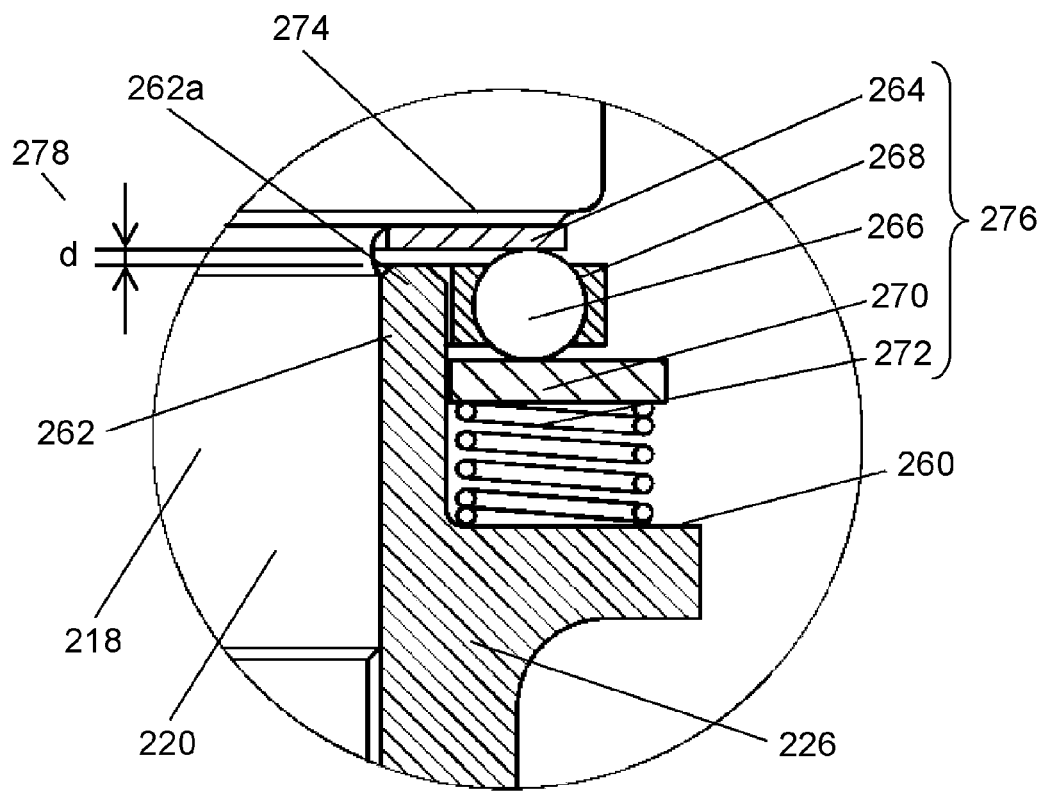
FIG. 5 is an enlarged view of an essential part of a thrust ball bearing in the hermetic compressor according to the second exemplary embodiment.

FIG. 4 is a longitudinal sectional view of a hermetic compressor according to a second exemplary embodiment of the present invention. FIG. 5 is an enlarged view of an essential part of a thrust ball bearing in the compressor.

In FIGS. 4 and 5, the hermetic compressor of the present exemplary embodiment includes airtight container 202 having compressor body 206, which is suspended by suspension springs 208. Airtight container 202 has lubricating oil 204 at its bottom, and is filled with R600a (isobutane), which is a refrigerant having a low global warming potential.

Compressor body 206 includes motor element 210 and compression element 212 driven thereby. Airtight container 202 is provided with power supply terminal 213 through which electric power is supplied to motor element 210.

First, motor element 210 is described as follows. Motor element 210 includes stator 214 and rotor 216. Stator 214 is formed of a copper winding, which is wound around a laminated iron core. Rotor 216 is arranged on the inner-diameter side of stator 214. The winding of stator 214 is connected, passing through power supply terminal 213, to an electric power supply (not shown) outside the compressor via a conductive wire.

Next, compression element 212 is described as follows. Compression element 212 is arranged above motor element 210, and includes shaft 218 having main shaft 220 and eccentric shaft 222 parallel to each other. Rotor 216 is fixed to main shaft 220.

Compression element 212 further includes cylinder block 224, which has main bearing 226 having a cylindrical inner surface. Main shaft 220 is rotatably supported in and by main bearing 226. In compression element 212, a load applied to eccentric shaft 222 is supported by the eccentric-shaft-side portions of main shaft 220 and main bearing 226 arranged below eccentric shaft 222 so as to form a cantilever bearing.

Shaft 218 has lubrication mechanism 228 including a spiral groove on the surface of main shaft 220. Cylinder block 224 further includes cylinder 234 having a cylindrical hole, and piston 230 reciprocating in cylinder 234. Compression element 212 further includes connection portion 236 having holes at its ends. Into these holes are fitted piston pin 238 of piston 230 and eccentric shaft 222 so as to connect eccentric shaft 222 and piston 230.

Cylinder 234 and piston 230 form compression space 248 together with valve plate 246, which is arranged on the end face of cylinder 234. Valve plate 246 is covered with fixed cylinder head 250. Cylinder head 250 is equipped with intake muffler 252, which is molded with a resin such as PBT in such a manner as to have a sound absorbing space inside.

The following is a description of thrust ball bearing 276. In FIGS. 4 and 5, thrust ball bearing 276 is arranged on thrust face 260 of main bearing 226. Main bearing 226 includes thrust face 260 and tubular extension portion 262. Thrust face 260 is a planar portion perpendicular to the central axis. Tubular extension portion 262 extends upward beyond thrust face 260 and has an inner surface facing the main shaft. Above tubular extension portion 262, there is provided upper race 264. On the outer-diameter side of tubular extension portion 262 and below upper race 264, there are provided balls 266 held in holder 268, lower race 270, and a plurality of support members 272. Upper race 264, balls 266, holder 268, lower race 270, and support members 272 together form thrust ball bearing 276. In the present exemplary embodiment, the support mechanism is composed of support members 272.

Upper and lower races 264 and 270 are annular metal plates, and are preferably made of heat-treated spring steel. These metal plates have parallel top and bottom sides each having a finished surface. Holder 268 is annular in shape and made of a resin such as polyamide, and has a plurality of holes in which balls 266 are held rotably. Support members 272 are elastic bodies arranged in a circumferential direction, and more specifically are four coil springs arranged at 90 degree intervals.

On thrust face 260 are support members 272, lower race 270, balls 266, and upper race 264 arranged in contact with each other in this order. On the top surface of upper race 264, there is placed flange 274 of shaft 218.

When thrust ball bearing 276 is mounted on the compressor, support members 272 are subjected to the load such as shaft 218 and rotor 216 via lower race 270. Support members 272 are further subjected to the thrust force in the axial direction of motor element 210 during the operation of the compressor. Support members 272 have spring characteristics in the direction of gravity, and therefore, are made lower in height than their natural length by this load. In this state, the coil springs forming support members 272 are in contact with thrust face 260 and lower race 270. Each dimension and the spring constant of support members 272 are determined in such a manner that upper race 264 and end 262a of tubular extension portion 262 have a gap "d" therebetween in this condition. Upper race 264 and end 262a of tubular extension portion 262, which face with each other with the gap "d" therebetween form movement restriction part 278.

When support members 272 are subjected to an eccentric load, those of the coil springs that are applied with a large load are deformed greatly, and the opposite ones of the coil springs are not deformed so much and become close to their natural length. Therefore, lower race 270 on support members 272 can be inclined according to the direction of the load.

The hermetic compressor having the above-described structure operates as follows. When electric power is supplied to motor element 210 through power supply terminal 213, stator 214 generates a magnetic field, which allows rotor 216 to rotate with shaft 218. The rotation of main shaft 220 makes eccentric shaft 222 perform eccentric rotation, which is converted by connection portion 236 so as to allow piston 230 to reciprocate in cylinder 234. Compression space 248 volumetrically changes so as to perform a compression operation in which the refrigerant is suctioned from airtight container 202 and then compressed.

In the intake stroke in the compression operation, the refrigerant in airtight container 202 is intermittently suctioned into compression space 248 through intake muffler 252, and compressed therein. After compressed, the high-temperature, high-pressure refrigerant is sent from airtight container 202 to the refrigeration cycle (not shown) through a discharge pipe or the like.

The bottom of shaft 218 is soaked in lubricating oil 204, so that the rotation of shaft 218 allows lubricating oil 204 to be supplied to each unit of compression element 212 so as to lubricate the sliding part by lubrication mechanism 228.

The following is a description of thrust ball bearing 276. In thrust ball bearing 276, balls 266 of the same size are made to roll between flat upper and lower races 264 and 270 in point contact therewith so as to greatly reduce friction to a low level. This reduces the sliding loss, thereby improving the efficiency of the hermetic compressor.

The load applied to thrust ball bearing 276 is the mass of shaft 218 or rotor 216, and the thrust force in the axial direction of motor element 210. The magnitude of the load is as small as 10 to 20 N in a hermetic compressor in an ordinary refrigerator.

In general, the contact load between the balls and the races of a ball bearing has an optimum value. When the contact load is too small, the frictional force between the balls and the races is not enough, causing slipping, and hence, damaging the surface of the contact area. When the contact load is too large, on the other hand, the contact points between the balls and the races have a large stress, causing fatigue fracture of the contact area. When the contact load is extremely large, plastic deformation can occur.

Therefore, in order to achieve the optimum contact load, the dimension values of the balls such as their diameter and number are determined according to the load conditions. When the contact load greatly deviates from the designed load conditions, that causes problems such as a significant decrease in the life of the compressor. The contact load between balls 266 and the races can greatly deviate from the design in the following two cases.

The first case is when upper and lower races 264 and 270 cannot be kept in parallel with each other. In a cantilever bearing, shaft 218 may be slightly inclined in the clearance between main shaft 220 and main bearing 226 by a compression load. Even such a slight inclination can cause the contact between balls 266 and upper and lower races 264 and 270 to be non-uniform.

Support members 272, however, can incline lower race 270 thereon in an arbitrary direction with respect to thrust face 260, and hence, maintain upper and lower races 264 and 270 in parallel relationship. This equalizes the load on all balls 266, preventing some of the balls 266 from being subjected to a larger or smaller load than the others, thereby preventing the compressor from having a shorter life.

The second case is when the hermetic compressor is subjected to an external force. This is, for example, when an impulsive load such as vibration during transportation is applied to thrust ball bearing 276. In this case, support members 272 are deformed because of being elastic in the direction of gravity. This reduces the increase in the load on the contact area between balls 266 and upper and lower races 264 and 270, thereby preventing the contact area from being subjected to plastic deformation such as sinking.

With an increase in the downward displacement of shaft 218, and hence in the deformation of support members 272, the load on the contact area between balls 266 and upper and lower races 264 and 270 also increases gradually. When the amount of displacement becomes equal to the gap "d" between upper race 264 and end 262a of tubular extension portion 262, support members 272 are not deformed any more. This is because of the presence of movement restriction part 278, which is formed by the contact between upper race 264 and end 262a of tubular extension portion 262. As a result, the load on the contact area between balls 266 and upper and lower races 264 and 270 is not increased any more either.

Furthermore, the spring force of support members 272 when deformed to an extent corresponding to the gap "d" is made smaller than the withstand load of thrust ball bearing 276. This ensures the prevention of the breakage of thrust ball bearing 276.

Thus, movement restriction part 278 functions before a load exceeding the withstand load is applied to thrust ball bearing 276.

The plurality of coil springs used as the elastic bodies composing support members 272 can generate a relatively less biased stress even when repeatedly deformed, thereby reducing fatigue fracture of the contact area, and improving durability of the compressor.

As described hereinbefore, according to the present exemplary embodiment, the presence of support members 272 allows the contact load between balls 266 and upper and lower races 264 and 270 to be within the optimum range even when the load is biased by the inclination of shaft 218 or is increased by an external force applied to thrust ball bearing 276. As a result, the contact area between balls 266 and upper and lower races 264 and 270 is prevented from wear or plastic deformation, thereby maintaining good sliding condition and reliability. The excellent maintenance of the sliding condition of thrust ball bearing 276 reduces friction and keeps good performance.

Furthermore, the surface of the contact area between balls 266 and upper and lower races 264 and 270 is prevented from damage, and a low noise level is maintained by preventing noise and vibration, which is caused when the contact load is unstable.

Support members 272 are four coil springs arranged at 90 degree intervals in the present exemplary embodiment, but may alternatively be five or more coil springs so as to obtain the same effect. Alternatively, support members 272 may be arranged according to the bias of the applied load, instead of being arranged at the regular intervals.

Support members 272 are made of coil springs in the present exemplary embodiment, but alternatively be made of other type of elastic body having elasticity to resist the load applied to thrust ball bearing 276 so as to allow the implementation of support members 272.

Compression element 212 is arranged above motor element 210 in the present exemplary embodiment, but may alternatively be arranged below it. In this case, thrust ball bearing 276 is generally arranged between rotor 216 and the upper end of main bearing 226, whereas support members 272 are generally arranged between lower race 270 and thrust face 260.

The thrust rolling bearing on thrust face 260 is thrust ball bearing 276 in the present exemplary embodiment, but may alternatively be other type of rolling bearing such as the one with rollers so as to provide the same effect.

Third Exemplary Embodiment

Figure 6:
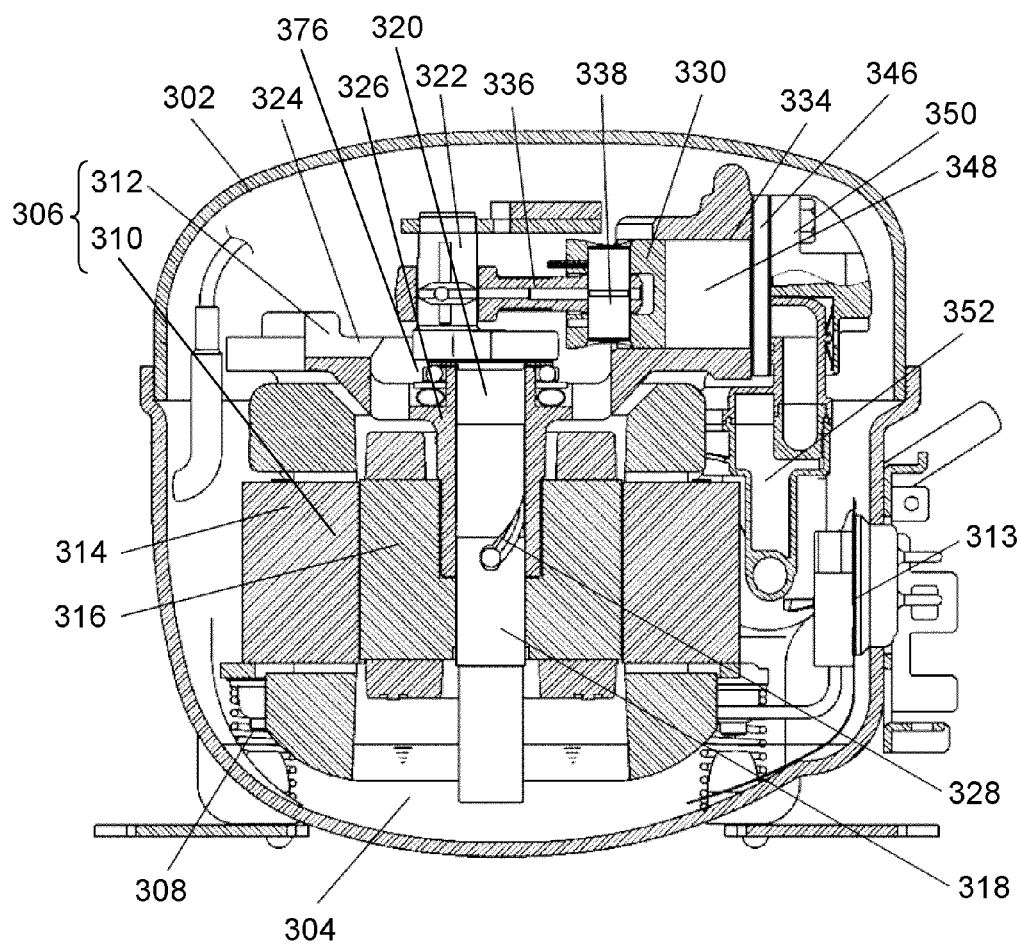
FIG. 6 is a longitudinal sectional view of a hermetic compressor according to a third exemplary embodiment of the present invention.
Figure 7:
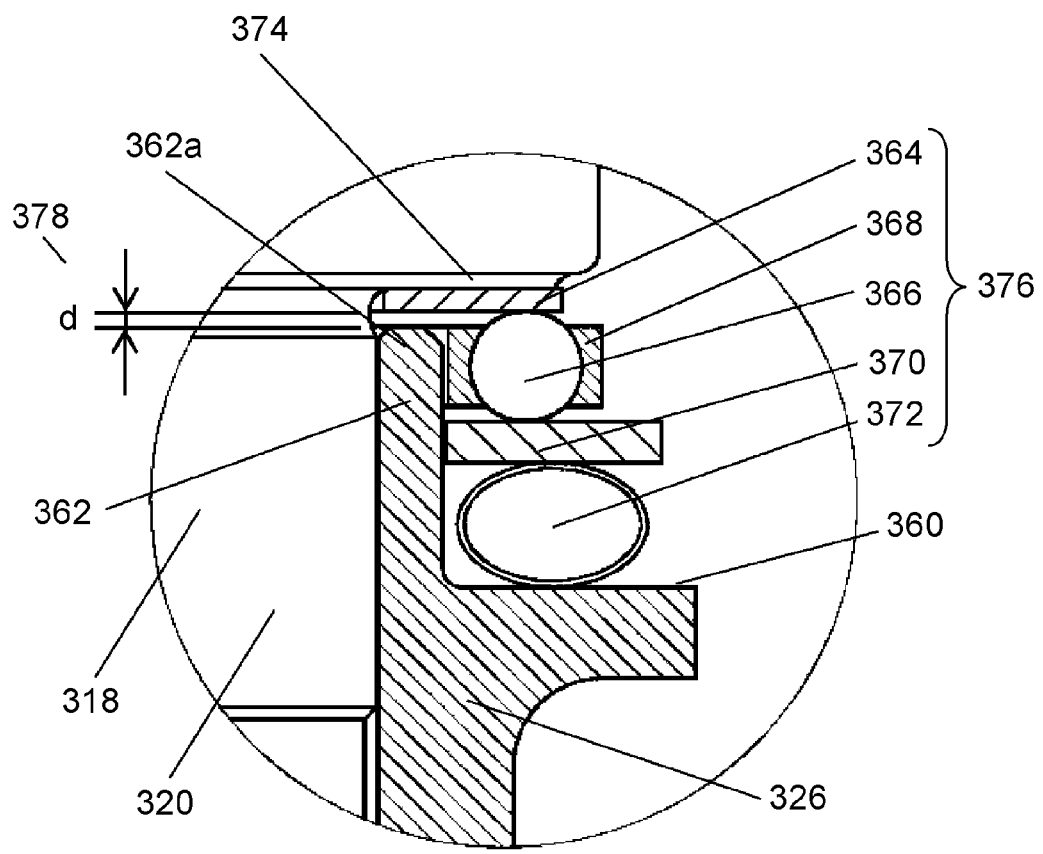
FIG. 7 is an enlarged view of an essential part of a thrust ball bearing in the hermetic compressor according to the third exemplary embodiment.

FIG. 6 is a longitudinal sectional view of a hermetic compressor according to a third exemplary embodiment of the present invention. FIG. 7 is an enlarged view of an essential part of a thrust ball bearing in the compressor.

In FIGS. 6 and 7, the hermetic compressor of the present exemplary embodiment includes airtight container 302 having compressor body 306, which is suspended by suspension springs 308. Airtight container 302 has lubricating oil 304 at its bottom, and is filled with R600a (isobutane), which is a refrigerant having a low global warming potential.

Compressor body 306 includes motor element 310 and compression element 312 driven thereby. Airtight container 302 is provided with power supply terminal 313 through which electric power is supplied to motor element 310.

First, motor element 310 is described as follows. Motor element 310 includes stator 314 and rotor 316. Stator 314 is formed of a copper winding, which is wound around a laminated iron core. Rotor 316 is arranged on the inner-diameter side of stator 314. The winding of stator 314 is connected, passing through power supply terminal 313, to an electric power supply (not shown) outside the compressor via a conductive wire.

Next, compression element 312 is described as follows. Compression element 312 is arranged above motor element 310, and includes shaft 318 having main shaft 320 and eccentric shaft 322 parallel to each other. Rotor 316 is fixed to main shaft 320.

Compression element 312 further includes cylinder block 324, which has main bearing 326 having a cylindrical inner surface. Main shaft 320 is rotatably supported in and by main bearing 326. In compression element 312, a load applied to eccentric shaft 322 is supported by the eccentric-shaft-side portions of main shaft 320 and main bearing 326 arranged below eccentric shaft 322 so as to form a cantilever bearing.

Shaft 318 has lubrication mechanism 328 including a spiral groove on the surface of main shaft 320. Cylinder block 324 further includes cylinder 334 having a cylindrical hole, and piston 330 reciprocating in cylinder 334. Compression element 312 further includes connection portion 336 having holes at its ends. Into these holes are fitted piston pin 338 of piston 330 and eccentric shaft 322 so as to connect eccentric shaft 322 and piston 330.

Cylinder 334 and piston 330 form compression space 348 together with valve plate 346, which is arranged on the end face of cylinder 334. Valve plate 346 is covered with fixed cylinder head 350. Cylinder head 350 is equipped with intake muffler 352, which is molded with a resin such as PBT in such a manner as to have a sound absorbing space inside.

The following is a description of thrust ball bearing 376. In FIGS. 6 and 7, thrust ball bearing 376 is arranged on thrust face 360 of main bearing 326. Main bearing 326 includes thrust face 360 and tubular extension portion 362. Thrust face 360 is a planar portion perpendicular to the central axis. Tubular extension portion 362 extends upward beyond thrust face 360 and has an inner surface facing main shaft 320.

Above tubular extension portion 362, there is provided upper race 364. On the outer-diameter side of tubular extension portion 362 and below upper race 364, there are provided balls 366 held in holder 368, lower race 370, and support member 372. Upper race 364, balls 366, holder 368, lower race 370, and support member 372 together form thrust ball bearing 376. In the present exemplary embodiment, the support mechanism is composed of support member 372.

Upper and lower races 364 and 370 are annular metal plates, and are preferably made of heat-treated spring steel. These metal plates have parallel top and bottom sides each having a finished surface. Holder 368 is annular in shape and made of a resin such as polyamide, and has a plurality of holes in which balls 366 are held rotably.

Support member 372 is a flexible annular tube filled with a liquid. More specifically, the tube is made of a flexible material such as rubber and is filled with oil On thrust face 360 are support member 372, lower race 370, balls 366, and upper race 364 arranged in contact with each other in this order. On the top surface of upper race 364, there is placed flange 374 of shaft 318.

When thrust ball bearing 376 is mounted on the hermetic compressor, support member 372 is subjected to the load such as shaft 318 and rotor 316 via lower race 370. Support member 372 is further subjected to the thrust force in the axial direction of motor element 310 during the operation of the compressor. Support member 372 has spring characteristics in the direction of gravity, and each dimension and the spring characteristics of support member 372 are determined in such a manner that upper race 364 and end 362a of tubular extension portion 362 have a gap "d" therebetween when the load is being applied. Upper race 364 and end 362a of tubular extension portion 362, which face with each other with the gap "d" therebetween form movement restriction part 378.

When support member 372 are subjected to an eccentric load, the portion of support member 372 that is applied with a large load has a large deformation, and the opposite portion is not deformed so much. Therefore, lower race 370 on support member 372 can be inclined according to the direction of the load.

The hermetic compressor having the above-described structure operates as follows. When electric power is supplied to motor element 310 through power supply terminal 313, stator 314 generates a magnetic field, which allows rotor 316 to rotate with shaft 318. The rotation of main shaft 320 makes eccentric shaft 322 perform eccentric rotation, which is converted by connection portion 336 so as to allow piston 330 to reciprocate in cylinder 334. Compression space 348 volumetrically changes so as to perform a compression operation in which the refrigerant is suctioned from airtight container 302 and then compressed. In the intake stroke in the compression operation, the refrigerant in airtight container 302 is intermittently suctioned into compression space 348 through intake muffler 352, and compressed therein. After compressed, the high-temperature, high-pressure refrigerant is sent from airtight container 302 to the refrigeration cycle (not shown) through a discharge pipe or the like.

The bottom of shaft 318 is soaked in lubricating oil 304, so that the rotation of shaft 318 allows lubricating oil 304 to be supplied to each unit of compression element 312 so as to lubricate the sliding part by lubrication mechanism 328.

The following is a description of thrust ball bearing 376. In thrust ball bearing 376, balls 366 of the same size are made to roll between flat upper and lower races 364 and 370 in point contact therewith so as to greatly reduce friction to a low level. This reduces the sliding loss, thereby improving the efficiency of the hermetic compressor.

The load applied to thrust ball bearing 376 is the mass of shaft 318 or rotor 316, and the thrust force in the axial direction of motor element 310. The magnitude of the load is as small as 10 to 20 N in a hermetic compressor in an ordinary refrigerator.

In general, the contact load between the balls and the races of a ball bearing has an optimum value. When the contact load is too small, the frictional force between the balls and the races is not enough, causing slipping, and hence, damaging the surface of the contact area. When the contact load is too large, on the other hand, the contact points between the balls and the races have a large stress, causing fatigue fracture of the contact area. When the contact load is extremely large, plastic deformation can occur.

Therefore, in order to achieve the optimum contact load, the dimension values of the balls such as their diameter and number are determined according to the load conditions. When the contact load greatly deviates from the designed load conditions, that causes problems such as a significant decrease in the life of the compressor. The contact load between balls 366 and the races can greatly deviate from the design in the following two cases.

The first case is when upper and lower races 364 and 370 cannot be kept in parallel with each other. In a cantilever bearing, shaft 318 may be slightly inclined in the clearance between main shaft 320 and main bearing 326 by a compression load. Even such a slight inclination can cause the contact between balls 366 and upper and lower races 364 and 370 to be non-uniform.

Support member 372, however, can incline lower race 370 thereon in an arbitrary direction with respect to thrust face 360, and hence, maintain upper and lower races 364 and 370 in parallel relationship. This equalizes the load on all balls 366, preventing some of the balls 366 from being subjected to a larger or smaller load than the others, thereby preventing the compressor from having a shorter life.

The second case is when the hermetic compressor is subjected to an external force. This is, for example, when an impulsive load such as vibration during transportation is applied to thrust ball bearing 376. In this case, support member 372 is deformed because of being elastic in the direction of gravity. This reduces the increase in the load on the contact area between balls 366 and upper and lower races 364 and 370, thereby preventing the contact area from being subjected to plastic deformation such as sinking.

With an increase in the downward displacement of shaft 318, and hence in the deformation of support member 372, the load on the contact area between balls 366 and upper and lower races 364 and 370 also increases gradually. When the amount of displacement becomes equal to the gap "d" between upper race 364 and end 362a of tubular extension portion 362, support member 372 is not deformed any more. This is because of the presence of movement restriction part 378, which is formed by the contact between upper race 364 and end 362a of tubular extension portion 362. As a result, the load on the contact area between balls 366 and upper and lower races 364 and 370 is not increased any more either.

Thus, movement restriction part 378 functions before a load exceeding the withstand load is applied to thrust ball bearing 376.

Support member 372 can be heavily damped because it is a flexible annular tube filled with a liquid. This makes it unlikely to cause rustling and other noises during the deformation of support member 372, and makes it likely to attenuate the sliding noise caused by thrust ball bearing 376. As a result, the noise of the compressor is reduced.

As described hereinbefore, according to the present exemplary embodiment, the presence of support member 372 allows the contact load between balls 366 and upper and lower races 364 and 370 to be within the optimum range even when the load is biased by the inclination of shaft 318 or is increased by an external force applied to thrust ball bearing 376. As a result, the contact area between balls 366 and upper and lower races 364 and 370 is prevented from wear or plastic deformation, thereby maintaining good sliding condition and reliability. The excellent maintenance of the sliding condition of thrust ball bearing 376 reduces friction and keeps good performance.

Furthermore, the surface of the contact area between balls 366 and upper and lower races 364 and 370 is prevented from damage, and at low noise level is maintained by preventing noise and vibration, which is caused when the contact load is unstable.

Compression element 312 is arranged above motor element 310 in the present exemplary embodiment, but may alternatively be arranged below it. In this case, thrust ball bearing 376 is generally arranged between rotor 316 and the upper end of main bearing 326, whereas support member 372 is generally arranged between lower race 370 and thrust face 360.

The thrust rolling bearing on thrust face 360 is thrust ball bearing 376 in the present exemplary embodiment, but may alternatively be other type of rolling bearing such as the one with rollers so as to provide the same effect.

Fourth Exemplary Embodiment

Figure 8:
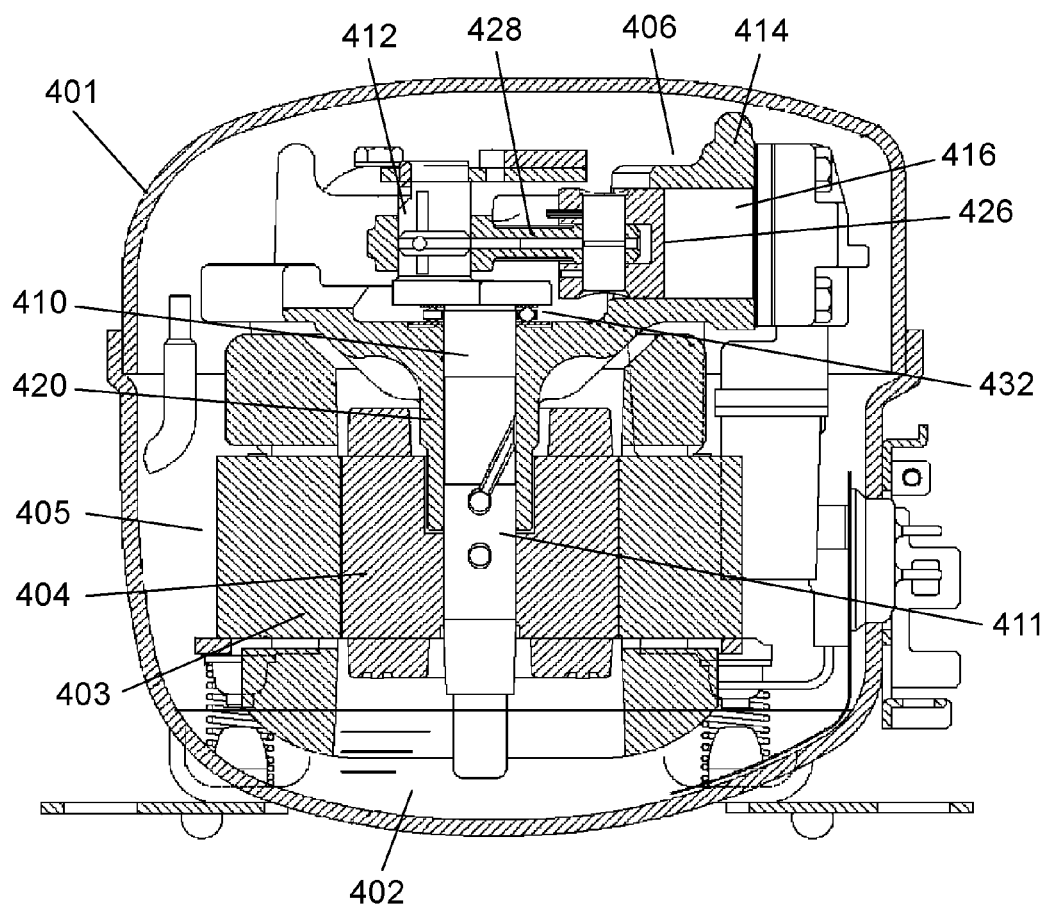
FIG. 8 is a longitudinal sectional view of a hermetic compressor according to a fourth exemplary embodiment of the present invention.
Figure 9:
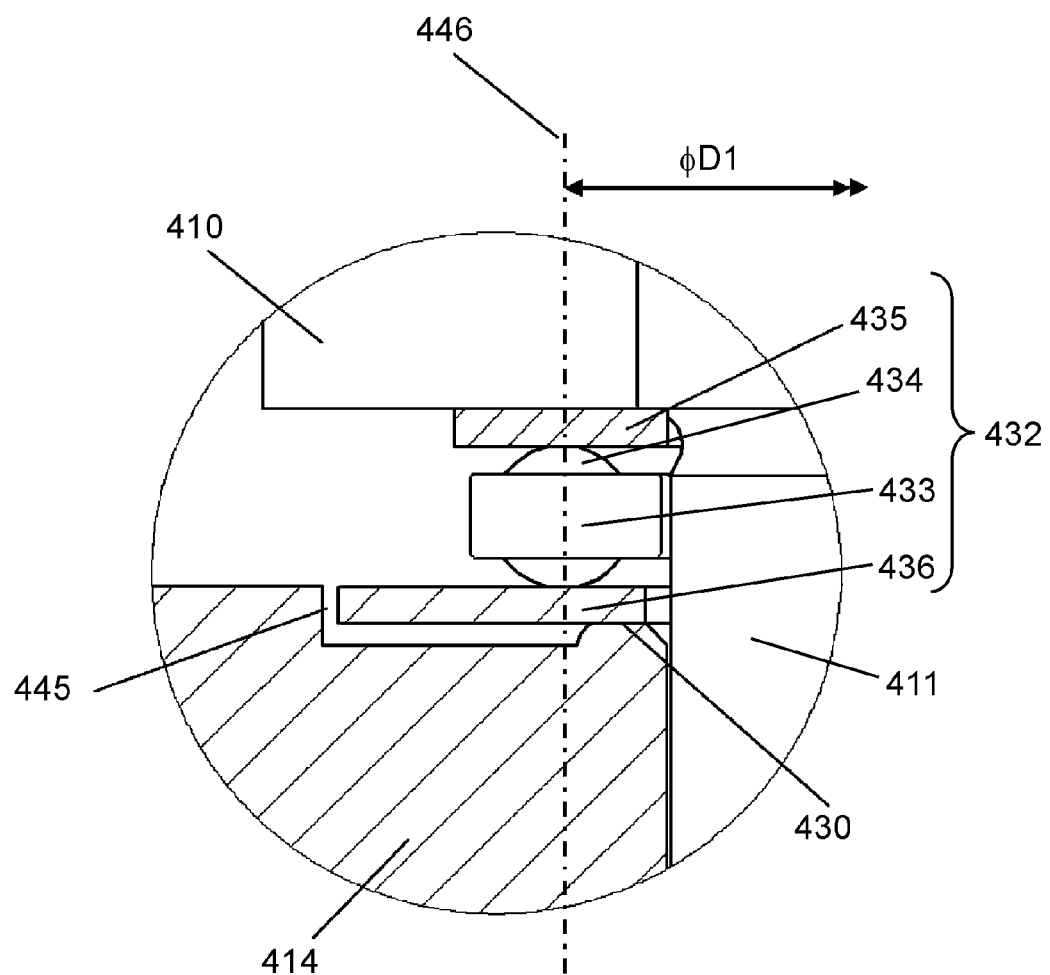
FIG. 9 is a sectional view of an essential part of the hermetic compressor according to the fourth exemplary embodiment.
Figure 10:
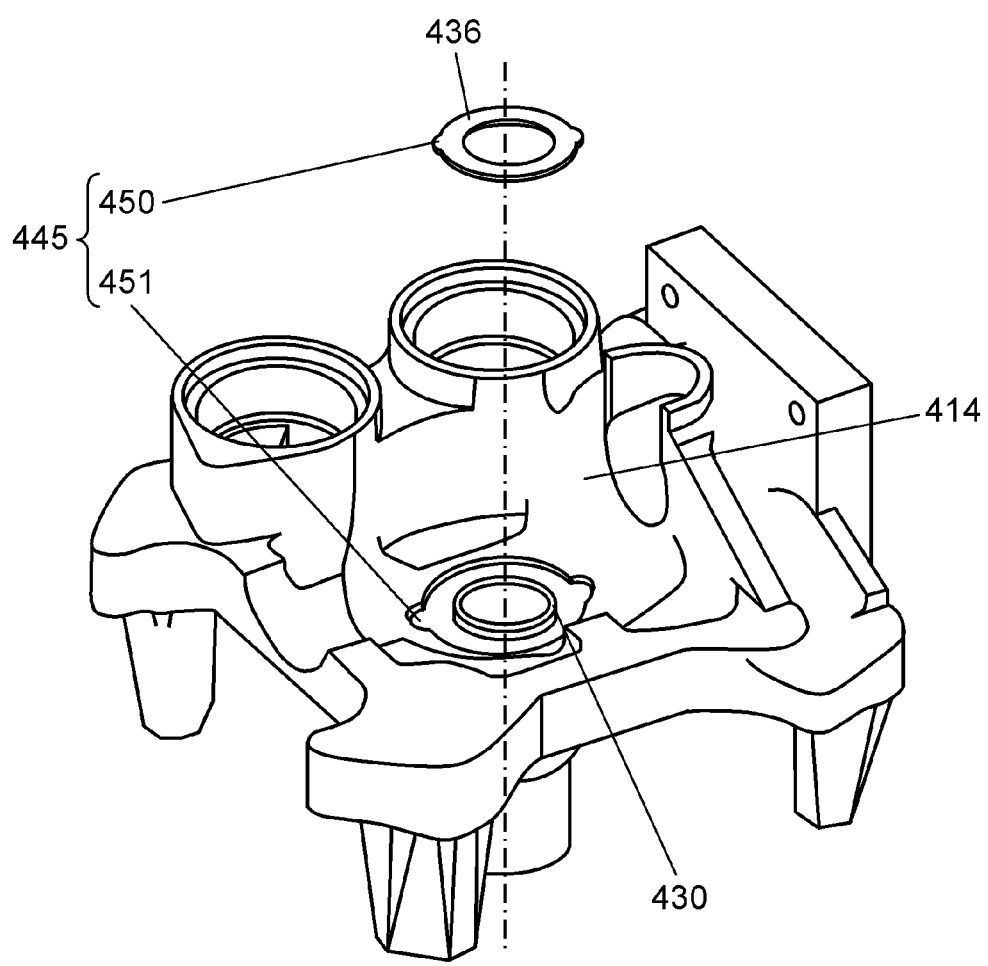
FIG. 10 is an exploded perspective view of the hermetic compressor according to the fourth exemplary embodiment.
Figure 11:
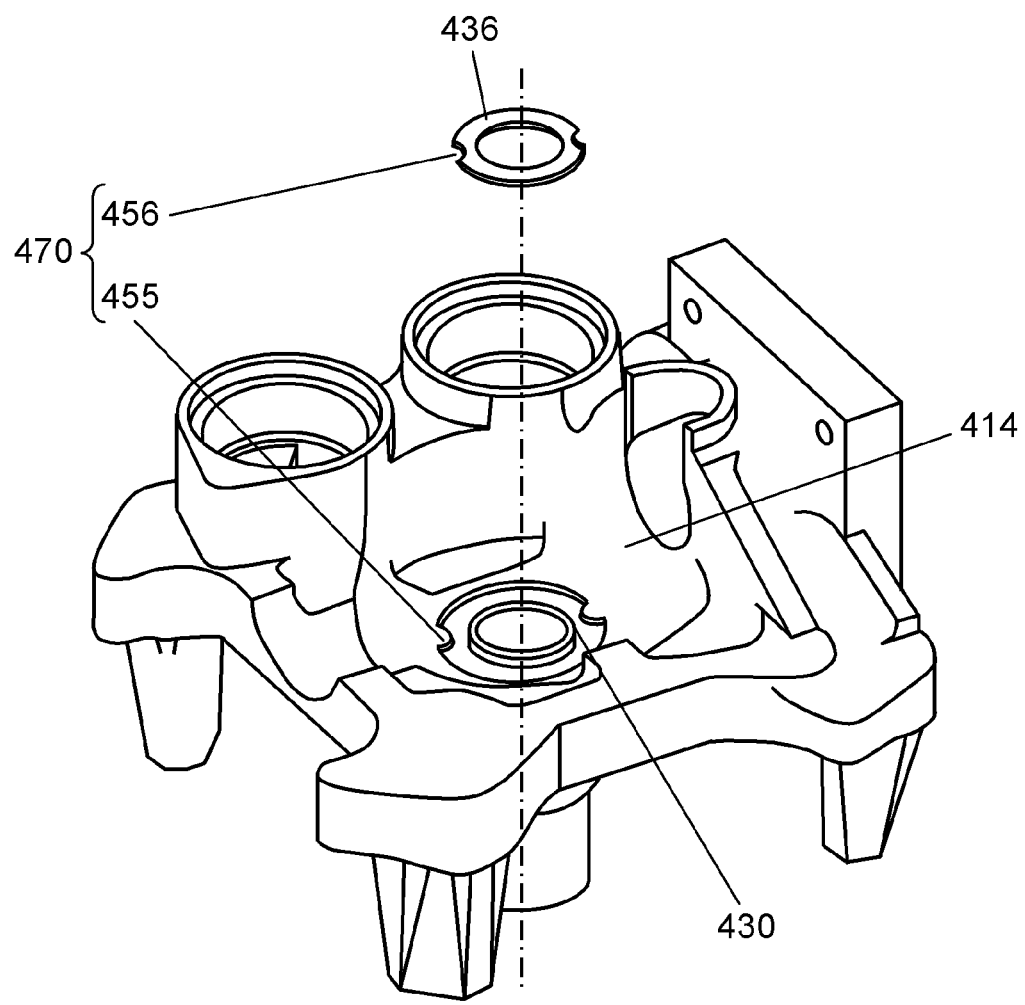
FIG. 11 is an exploded perspective view of another example of the hermetic compressor according to the fourth exemplary embodiment.

FIG. 8 is a longitudinal sectional view of a hermetic compressor according to a fourth exemplary embodiment of the present invention. FIG. 9 is a sectional view of an essential part of the compressor. FIG. 10 is an exploded perspective view of the compressor. FIG. 11 is an exploded perspective view of another example of the compressor.

In FIGS. 8 to 11, the hermetic compressor includes airtight container 401 having lubricating oil 402. Airtight container 401 includes motor element 405 and compression element 406 driven thereby. Motor element 405 includes stator 403 and rotor 404. Compression element 406 includes shaft 410 having main shaft 411 and eccentric shaft 412. Rotor 404 is fixed to main shaft 411. Eccentric shaft 412 is arranged above main shaft 411 in such a manner as to be eccentric thereto.

Compression element 406 further includes cylinder block 414, which includes compression space 416 substantially cylindrical in shape and main bearing 420. Main bearing 420 is fixed to cylinder block 414, and supports main shaft 411. Compression element 406 further includes piston 426, which forms compression space 416 together with the cylinder (not shown) of cylinder block 414. Piston 426 is connected to eccentric shaft 412 via connection portion 428, and reciprocates in compression space 416.

On the upper end of main bearing 420 of cylinder block 414, there is provided thrust face 430, which is annular in shape and substantially perpendicular to the central axis of main bearing 420. On thrust face 430, there are provided balls 434, holder 433 for holding balls 434, upper race 435 on balls 434, and lower race 436 beneath balls 434 so as to support shaft 410. Upper race 435, balls 434, holder 433, and lower race 436 together form thrust ball bearing 432. Thus, thrust ball bearing 432 is arranged on thrust face 430 of main bearing 420. In the present exemplary embodiment, the support mechanism is composed of lower race 436 and thrust face 430 which is arranged only on the side of the central axis of main bearing 420 with respect to the track of rolling balls 434.

Thrust face 430 on which lower race 436 is placed is arranged only on the side of the central axis of main bearing 420 of cylinder block 414 with respect to pitch circle 446 of rolling balls 434. Pitch circle 446 indicates the track of the center of gravity of rolling balls 434, and has a diameter of ϕD1 as shown in FIG. 9. In other words, thrust face 430 is not formed below the center of gravity of rolling balls 434. Therefore, lower race 436 is elastic in the direction perpendicular to the center of gravity.

As shown in FIG. 10, lower race 436 is provided on its periphery with lower race projections 450, which project in the radial direction. Thrust face 430 of cylinder block 414 is provided on its periphery with bearing notches 451, which are engaged with lower race projections 450 of lower race 436. Thus, lower race projections 450 of lower race 436 and bearing notches 451 on the periphery of thrust face 430 of cylinder block 414 are engaged with each other to form rotation control part 445.

Balls 434 are made of carburized bearing steel having high abrasion resistance, and their surface hardness is in the range of 60 to 70 on the Rockwell Hardness C-scale (HRC). Upper and lower races 435 and 436 are made of heat-treated carbon steel having high abrasion resistance, and their surface hardness is in the range of 58 to 68 HRC. The surface hardness of balls 434 is set to be slightly higher than that of upper and lower races 435 and 436.

The refrigerant used in the present hermetic compressor can be, for example, R134a with zero ozone depleting potential, or a hydrocarbon natural refrigerant with a low global warming potential such as R600a. These refrigerants can be combined with lubricating oil 402, which is compatible therewith.

The hermetic compressor having the above-described structure operates as follows. Rotor 404 of motor element 405 rotates shaft 410, and the rotation of eccentric shaft 412 is transmitted to piston 426 via connection portion 428, allowing piston 426 to reciprocate in compression space 416. As a result, the refrigerant gas is suctioned from the refrigeration system (not shown) into compression space 416, compressed therein, and again discharged into the refrigeration system.

Thrust ball bearing 432 supports the weights of shaft 410 and rotor 404. The rotation of shaft 410 is made smooth by balls 434 rolling between upper and lower races 435 and 436. Using thrust ball bearing 432 can reduce the loss of the thrust bearing because the torque to rotate shaft 410 is smaller than in a thrust slide bearing. As a result, motor element 405 requires less power, making the compressor efficient.

When a compressive load is applied to piston 426 in the compression stroke, the compressive load is also applied to eccentric shaft 412 of shaft 410, which is connected via connection portion 428. In this case, shaft 410 has a degree of freedom of inclination corresponding to the length of the clearance between main shaft 411 of shaft 410 and main bearing 420 in cylinder block 414. As a result, eccentric shaft 412 may be inclined in the direction opposite to the compression.

When eccentric shaft 412 is inclined in the direction opposite to the compression, the load is applied to upper race 435, balls 434, and lower race 436. However, thrust face 430 on which lower race 436 is placed is arranged only on the side of the central axis of main bearing 420 of cylinder block 414 with respect to pitch circle 446 of rolling balls 434. Therefore, lower race 436 is inclined together with shaft 410. In other words, lower race 436 is inclined together with shaft 410 by the elastic support mechanism composed of lower race 436 and thrust face 430 which is arranged only on the side of the central axis of main bearing 420 with respect to the track of rolling balls 434.

As a result, the entire thrust ball bearing 432 can relatively easily be inclined. This allows upper and lower races 435 and 436 to have a substantially uniform space therebetween in the track of balls 434, so that the weights of shaft 410 and rotor 404 are applied substantially equally to all balls 434. As a result, balls 434 rotate smoothly without uneven contact so as to prevent balls 434 and upper and lower races 435 and 436 from being subjected to excessive repeated stress and hence, to damage such as fatigue peeling. This makes the compressor highly reliable.

As shown in FIG. 10, in the present exemplary embodiment, lower race projections 450 of lower race 436 and bearing notches 451 on the periphery of thrust face 430 of cylinder block 414 are engaged with each other to form rotation control part 445. This structure prevents lower race 436 from being rotated and slid against thrust face 430 of cylinder block 414, thereby causing the wear of the contact area.

This structure prevents particularly the wear of thrust face 430, which is vulnerable to wear because of its relatively low hardness.

Furthermore, the lubricating oil having a low viscosity of VG3 to VG8 allows the sliding part to have low loss and high efficiency.

As described above, the present exemplary embodiment uses rotation control part 445 formed by engaging lower race projections 450 of lower race 436 with bearing notches 451 on the periphery of thrust face 430 of cylinder block 414.

Alternatively, a similar effect can be obtained by using another rotation control part 470 formed by engaging lower race notches 456 of lower race 436 with bearing projections 455 on the periphery of thrust face 430 of cylinder block 414 as shown in FIG. 11.

The thrust rolling bearing on thrust face 430 is thrust ball bearing 432 in the present exemplary embodiment, but may alternatively be other type of rolling bearing such as the one with rollers so as to provide the same effect.

Fifth Exemplary Embodiment

Figure 12:
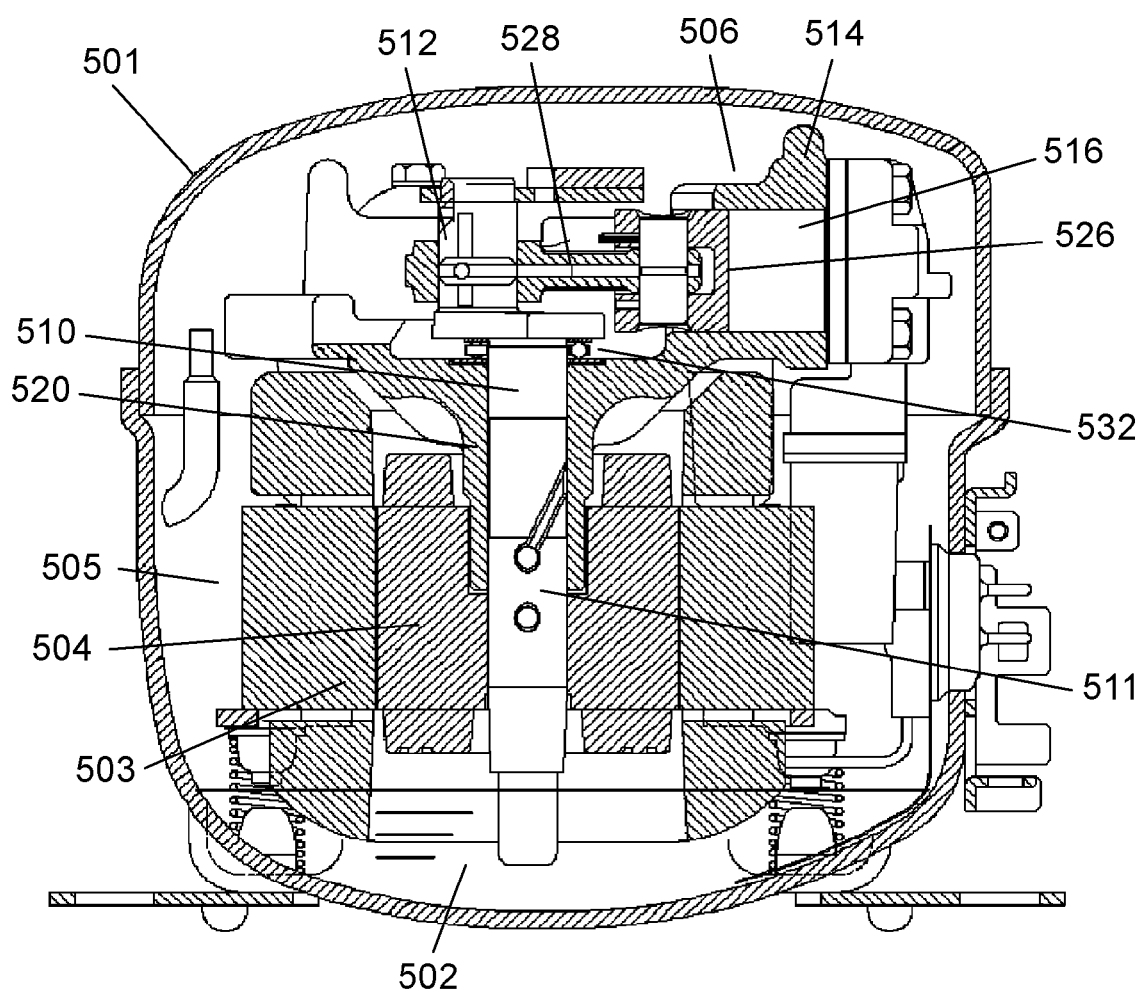
FIG. 12 is a longitudinal sectional view of a hermetic compressor according to a fifth exemplary embodiment of the present invention.
Figure 13:
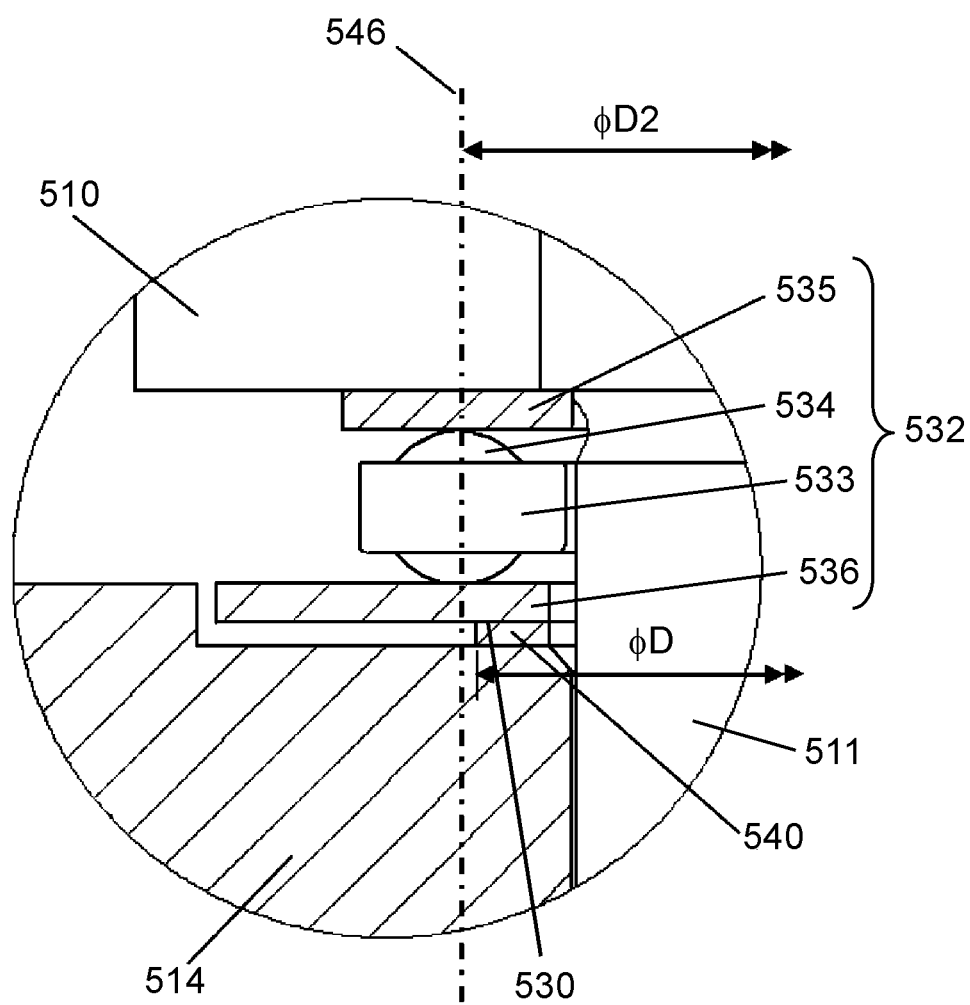
FIG. 13 is a sectional view of an essential part of the hermetic compressor according to the fifth exemplary embodiment.
Figure 14:
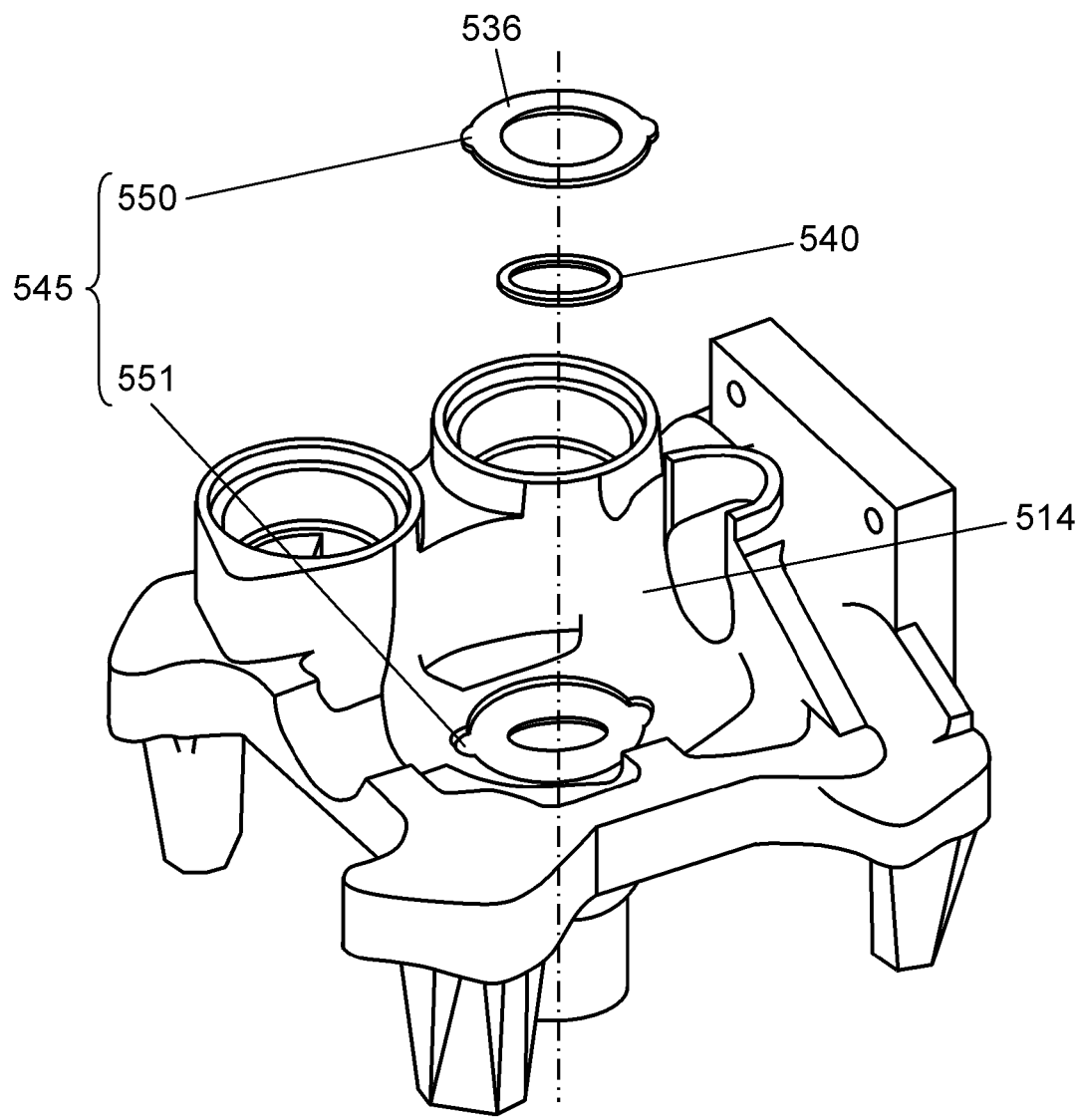
FIG. 14 is an exploded perspective view of the hermetic compressor according to the fifth exemplary embodiment.
Figure 15:
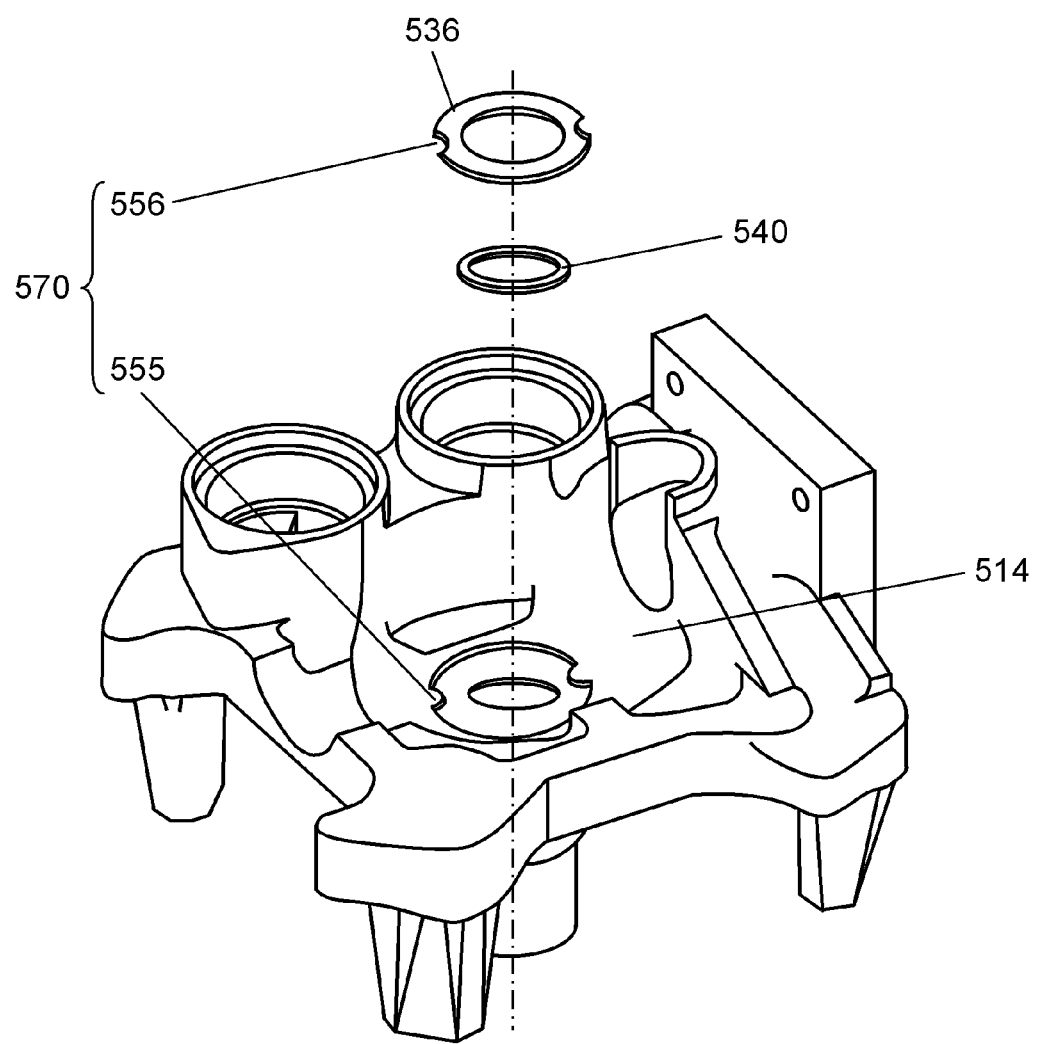
FIG. 15 is an exploded perspective view of another example of the hermetic compressor according to the fifth exemplary embodiment.
Figure 16:
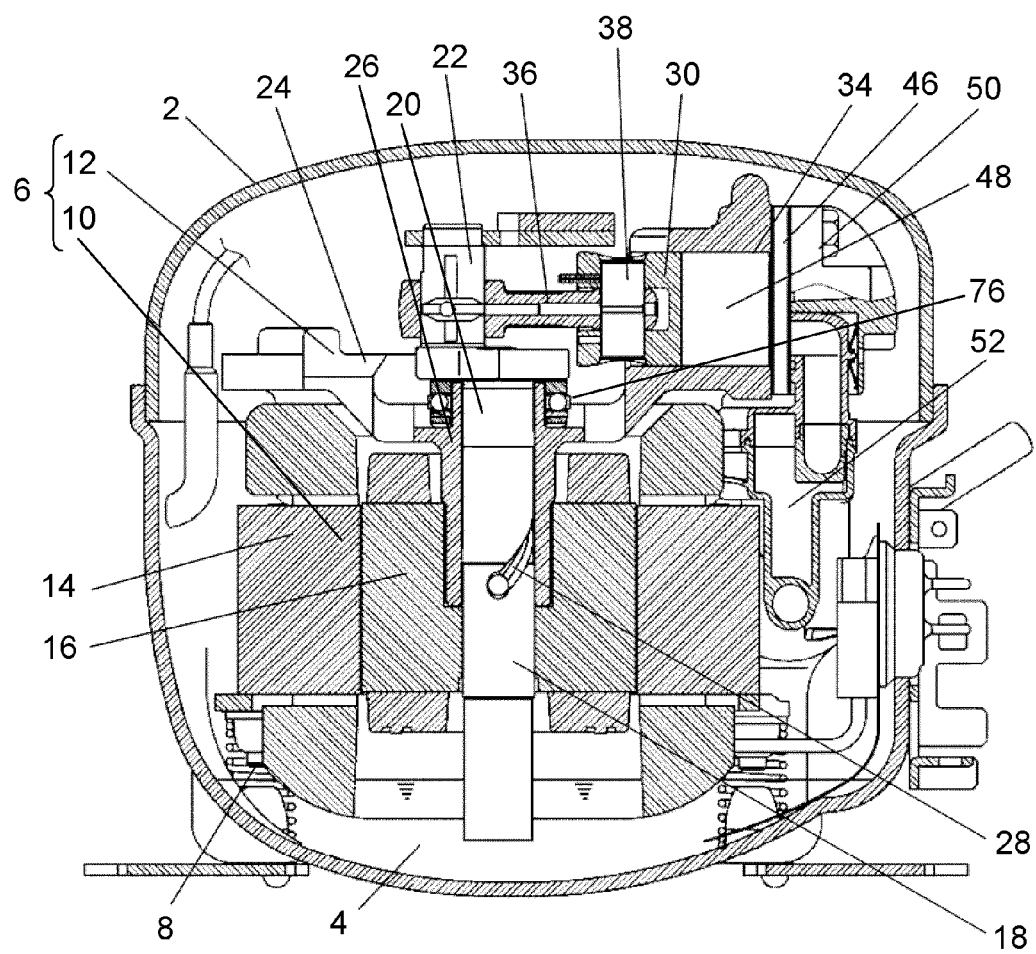
FIG. 16 is a longitudinal sectional view of a conventional hermetic compressor.
Figure 17:
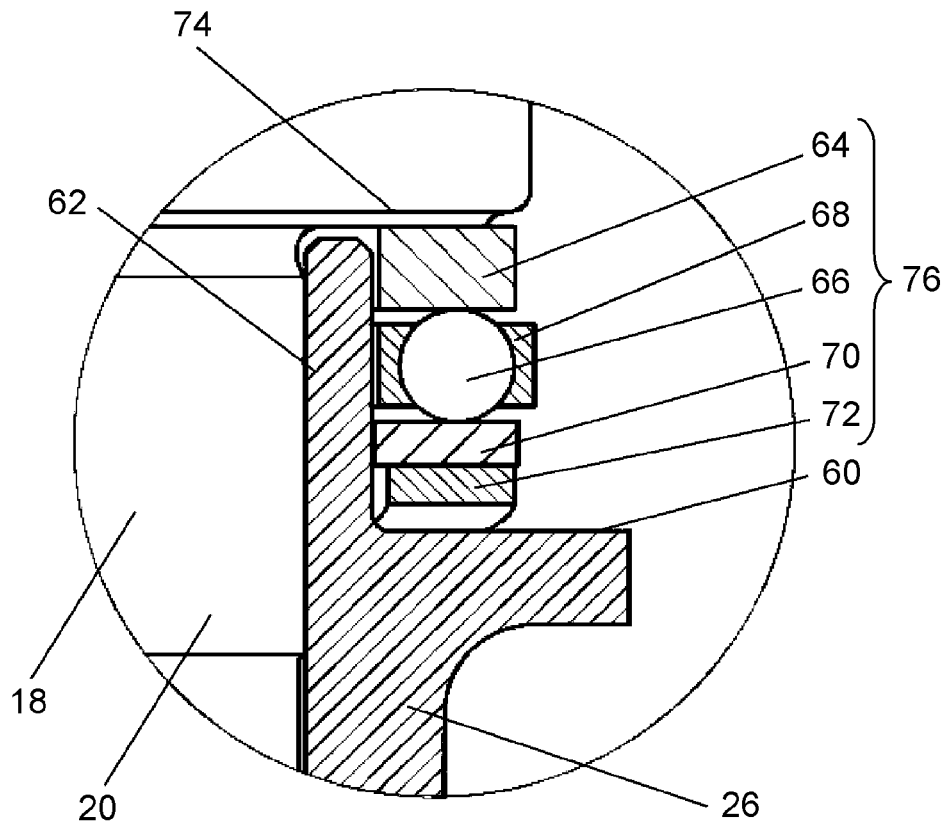
FIG. 17 is an enlarged view of an essential part of a thrust ball bearing in the conventional hermetic compressor.
Figure 18:
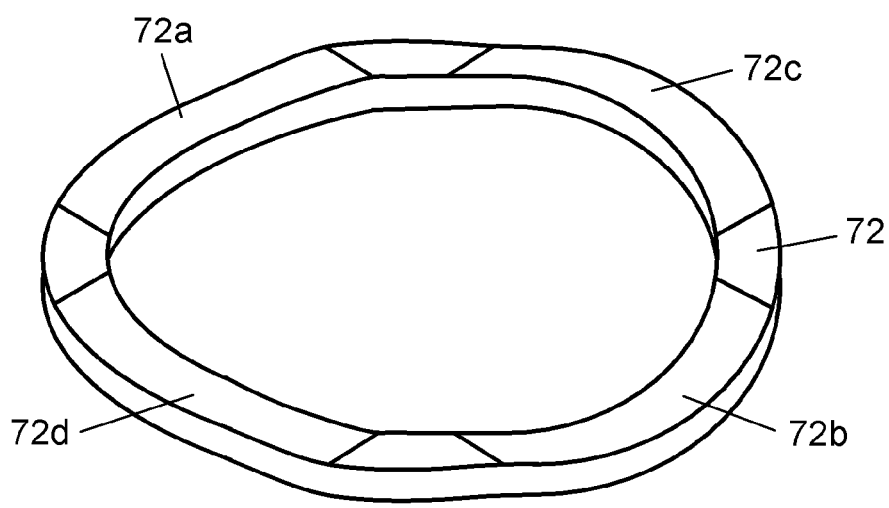
FIG. 18 is a perspective view of a support member in the conventional hermetic compressor.
Figure 19:
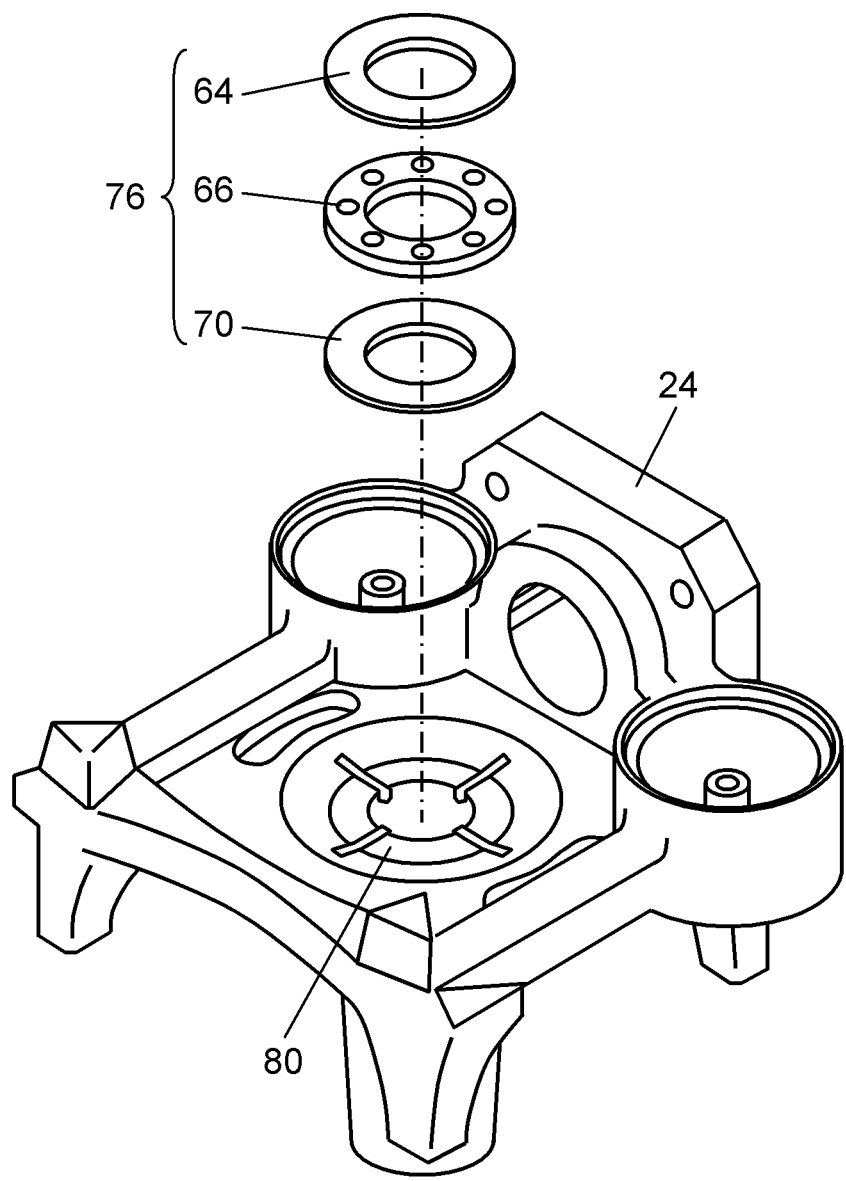
FIG. 19 is an exploded perspective view of another conventional hermetic compressor.

FIG. 12 is a longitudinal sectional view of a hermetic compressor according to a fifth exemplary embodiment of the present invention. FIG. 13 is a sectional view of an essential part of the compressor. FIG. 14 is an exploded perspective view of the compressor. FIG. 15 is an exploded perspective view of another example of the compressor.

In FIGS. 12 to 15, the hermetic compressor includes airtight container 501 having lubricating oil 502. Airtight container 501 includes motor element 505 and compression element 506 driven thereby. Motor element 505 includes stator 503 and rotor 504. Compression element 506 includes shaft 510 having main shaft 511 and eccentric shaft 512. Rotor 504 is fixed to main shaft 511. Eccentric shaft 512 is arranged above main shaft 511 in such a manner as to be eccentric thereto.

Compression element 506 further includes cylinder block 514, which includes compression space 516 substantially cylindrical in shape and main bearing 520. Main bearing 520 is fixed to cylinder block 514, and supports main shaft 511. Compression element 506 further includes piston 526, which is connected to eccentric shaft 512 via connection portion 528, and reciprocates in compression space 516 of cylinder block 514.

On the upper end of main bearing 520 of cylinder block 514, there is provided thrust face 530 formed of thrust race 540. Thrust face 530 is annular in shape and substantially perpendicular to the central axis of main bearing 520. On thrust face 530, there are provided balls 534, holder 533 for holding balls 534, upper race 535 on balls 534, and lower race 536 beneath balls 534 so as to support shaft 510. Upper race 535, balls 534, holder 533, and lower race 536 together form thrust ball bearing 532. Thus, thrust ball bearing 532 is arranged on thrust face 530 of main bearing 520. In the present exemplary embodiment, the support mechanism is composed of lower race 536 and thrust face 530 which is arranged only on the side of the central axis of main bearing 520 with respect to pitch circle 546 of rolling balls 534.

Thrust race 540 on which lower race 536 is placed has an outer diameter ($\phi$D) smaller than the diameter of pitch circle 546 of rolling balls 534. Pitch circle 546 indicates the track of the center of gravity of rolling balls 534, and has a diameter of $\phi$D2 as shown in FIG. 13. In other words, thrust face 530 is not formed below the center of gravity of rolling balls 534. Therefore, lower race 536 is elastic in the direction perpendicular to the center of gravity.

Lower race 536 is provided on its periphery with lower race projections 550, which project in the radial direction. Thrust face 530 of cylinder block 514 is provided with bearing notches 551, which are engaged with lower race projections 550 of lower race 536. Thus, lower race projections 550 of lower race 536 and bearing notches 551 of thrust face 530 of cylinder block 514 are engaged with each other to form rotation control part 545.

Balls 534 are made of carburized bearing steel having high abrasion resistance, and their surface hardness is in the range of 60 to 70 HRC. Upper and lower races 535 and 536 are made of heat-treated carbon steel having high abrasion resistance, and their surface hardness is in the range of 58 to 68 HRC. The surface hardness of balls 534 is set to be slightly higher than that of upper and lower races 535 and 536.

The refrigerant used in the present hermetic compressor can be, for example, R134a with zero ozone depleting potential, or a hydrocarbon natural refrigerant with a low global warming potential such as R600a. These refrigerants can be combined with lubricating oil 502, which is compatible therewith.

The hermetic compressor having the above-described structure operates as follows. Rotor 504 of motor element 505 rotates shaft 510, and the rotation of eccentric shaft 512 is transmitted to piston 526 via connection portion 528, allowing piston 526 to reciprocate in compression space 516. As a result, the refrigerant gas is suctioned from the refrigeration system (not shown) into compression space 516, compressed therein, and again discharged into the refrigeration system.

Thrust ball bearing 532 supports the weights of shaft 510 and rotor 504. The rotation of shaft 510 is made smooth by balls 534 rolling between upper and lower races 535 and 536. Using thrust ball bearing 532 can reduce the loss of the thrust bearing because the torque to rotate shaft 510 is smaller than in a thrust slide bearing. As a result, motor element 505 requires less power, making the compressor efficient.

When a compressive load is applied to piston 526 in the compression stroke, the compressive load is also applied to eccentric shaft 512 of shaft 510, which is connected via connection portion 528. In this case, shaft 510 has a degree of freedom of inclination corresponding to the length of the clearance between main shaft 511 of shaft 510 and main bearing 520 in cylinder block 514. As a result, eccentric shaft 512 may be inclined in the direction opposite to the compression.

When eccentric shaft 512 is inclined in the direction opposite to the compression, the load is applied to upper race 535, balls 534, and lower race 536. However, thrust face 530 formed of thrust race 540 and on which lower race 536 is placed is arranged only on the side of the central axis of main bearing 520 of cylinder block 514 with respect to pitch circle 546 of rolling balls 534. Therefore, lower race 536 is inclined together with shaft 510. In other words, lower race 536 is inclined together with shaft 510 by the elastic support mechanism composed of lower race 536 and thrust face 530 which is arranged only on the side of the central axis of main bearing 520 with respect to the track of rolling balls 534. As a result, the entire thrust ball bearing 532 can relatively easily be inclined.

This allows upper and lower races 535 and 536 to have a substantially uniform space therebetween in the track of balls 534, so that the weights of shaft 510 and rotor 504 are applied substantially equally to all balls 534. As a result, balls 534 rotate smoothly without uneven contact so as to prevent balls 534 and upper and lower races 535 and 536 from being subjected to excessive repeated stress and hence, to damage such as fatigue peeling. This makes the compressor highly reliable.

In addition, using thrust race 540 eliminates the need to improve machining accuracy of cylinder block 514, thereby increasing machining efficiency, and hence, productivity.

As shown in FIG. 14, in the present exemplary embodiment, lower race projections 550 of lower race 536 and bearing notches 551 on the periphery of thrust face 530 of cylinder block 514 are engaged with each other to form rotation control part 545. This structure prevents lower race 536 from being rotated and slid against thrust face 530 of cylinder block 514, thereby causing the wear of the contact area. Furthermore, the lubricating oil having a low viscosity of VG3 to VG8 allows the sliding part to have low loss and high efficiency.

As described above, the present exemplary embodiment uses rotation control part 545 formed by engaging lower race projections 550 of lower race 536 with bearing notches 551 on the periphery of thrust face 530 of cylinder block 514.

Alternatively, a similar effect can be obtained by using another rotation control part 570 formed by engaging lower race notches 556 of lower race 536 with bearing projections 555 on the periphery of thrust face 530 of cylinder block 514 as shown in FIG. 15.

The thrust rolling bearing on thrust face 530 is thrust ball bearing 532 in the present exemplary embodiment, but may alternatively be other type of rolling bearing such as the one with rollers so as to provide the same effect.

As described hereinbefore, the hermetic compressor of the present invention includes an airtight container including: a motor element having a stator and a rotor; a compression element driven by the motor element; and lubricating oil for lubricating the compression element. The compression element includes: a shaft having a main shaft and an eccentric shaft, the rotor being fixed to the main shaft; a cylinder block having a compression space; a piston reciprocating in the compression space; a connection portion connecting the piston and the eccentric shaft; a main bearing in the cylinder block, the main bearing supporting the main shaft; and a thrust rolling bearing on a thrust face of the main bearing. The thrust rolling bearing includes: a plurality of rolling elements held in a holder; a upper race and a lower race arranged respectively on and beneath the rolling elements; and a support mechanism below the rolling elements, the support mechanism being elastic.

This structure prevents the rolling elements from being subjected to a load unevenly, thereby preventing the efficiency, noise level, and reliability of the compressor from being adversely affected by the unevenness of a contact load.

The thrust rolling bearing in the present invention is the thrust ball bearing including the balls held in the holder, the upper race on the balls, the lower race beneath the balls, and the elastic support mechanism beneath the balls.

This structure provides the hermetic compressor with low friction, high efficiency, and high reliability The support mechanism in the present invention is the support member which is elastic in the direction of gravity and is arranged between the thrust face and either the upper or lower race.

With this structure, even when a large external force is applied to the compressor, the support member is deformed to prevent an increase in the contact load between the balls and the upper and lower races. This prevents the thrust rolling bearing from plastic deformation, ensuring the sliding condition of the thrust rolling bearing. As a result, the hermetic compressor has high efficiency, low noise level, and high reliability.

In the support member in the present invention, when a portion of it has large elastic deformation, another portion has small elastic deformation so as to allow the thrust rolling bearing to be inclined with respect to the thrust face.

With this structure, even when the shaft is inclined with respect to the main bearing, the upper and lower races are secured in parallel relationship. This prevents the thrust rolling bearing from being damaged due to an increase in the load applied to some of the rolling elements. As a result, the hermetic compressor is highly reliable.

The present invention includes the movement restriction part for restricting the shaft from moving downward in the direction of gravity.

With this structure, even when a large external force is applied to the compressor, the movement restriction part supports the load so as to prevent an extreme increase in the contact load between the rolling elements and the upper and lower races. This prevents the thrust rolling bearing from plastic deformation, ensuring the sliding condition of the thrust rolling bearing. As a result, the hermetic compressor has high efficiency, low noise level, and high reliability.

The movement restriction part in the present invention functions before a load exceeding the withstand load is applied to the thrust rolling bearing.

With this structure, the thrust rolling bearing is never subjected to a load exceeding the withstand load. This securely prevents the thrust rolling bearing from plastic deformation, ensuring the sliding condition of the thrust rolling bearing. As a result, the hermetic compressor has high efficiency, low noise level, and high reliability.

The support member in the present invention is the annular wave washer including upward projections projecting toward and in contact with the lower race and downward projections projecting toward and in contact with the thrust face. The upward and downward projections are alternated in the circumferential direction.

With this structure, the top and bottom surfaces of the wave washer are in secure contact with the thrust face and the lower race respectively. This maintains the upper and lower races in parallel relationship so as to prevent a large load from being applied only to some of the rolling elements, thereby improving the reliability of the compressor. When a large external force is applied to the compressor, the wave washer is deformed to prevent an increase in the contact load between the rolling elements and the upper and lower races. This prevents the thrust rolling bearing from plastic deformation and improves its reliability. As a result, the hermetic compressor is simple in structure and compact.

The washer in the present invention may be formed of a plurality of identically-shaped wave washer members stacked on each other.

With this structure, the support member can be compact and sufficiently rigid for the magnitude of the contact load. As a result, the hermetic compressor is highly reliable.

The present invention may use a plurality of support members, which are elastic bodies arranged in the circumferential direction. With this structure, the use of the plurality of elastic bodies facilitates a design that does not cause local stress concentration due to the deformation of the elastic bodies, thereby improving their durability against repeated deformation. The deformation of the elastic bodies maintains the upper and lower races in parallel relationship so as to prevent a large load from being applied only to some of the rolling elements, thereby improving the reliability of the hermetic compressor.

The support member in the present invention may be a flexible annular tube filled with a fluid.

This structure prevents noise due to rustling and facilitates a design that does not cause local stress concentration due to the deformation of the tube, thereby improving their durability against repeated deformation. The deformation of the tube maintains the upper and lower races in parallel relationship so as to prevent a large load from being applied only to some of the rolling elements, thereby further improving the reliability of the hermetic compressor.

The support mechanism in the present invention is composed of the thrust face and the lower race placed thereon. The thrust face is arranged only on the side of the central axis of the main bearing with respect to the track of the rolling elements.

With this structure, when a compressive load is applied to the piston in the compression stroke, the compressive load is also applied to the eccentric shaft of the shaft, which is connected via the connection portion. In this case, when the shaft is inclined in the clearance between the main shaft and the main bearing of the cylinder block, the lower race is also inclined together with the shaft. This allows the space between the upper and lower races to be substantially uniform in the track of the rolling elements, thereby preventing the load from being concentrated only on specific rolling elements. In other words, the load is distributed evenly across all rolling elements, thereby reducing the uneven contact of the rolling elements. As a result, the hermetic compressor has low noise level, high efficiency, and high reliability.

The thrust face in the present invention has an outer diameter smaller than the diameter of the pitch circle of the rolling elements. This structure makes it easy to achieve a high surface roughness of the thrust face, thereby reducing the machining time of the cylinder block. As a result, the hermetic compressor has much higher productivity.

The present invention further includes the rotation control part on the periphery of the thrust face so as to control the rotation of the lower race. This structure prevents the lower race from rotating together with the rolling elements so as to avoid the rolling elements from slipping instead of rotating, thereby preventing the damage of the rolling elements and the upper and lower races, making the hermetic compressor more reliable.

The rotation control part in the present invention includes the lower race projections on the periphery of the lower race in such a manner as to project in the radial direction, and the bearing notches on the perypery of the thrust face so as to lock the lower race projections. This structure prevents the rolling elements from slipping instead of rotating, making the hermetic compressor more reliable.

The rotation control part in the present invention includes the bearing projections on the periphery of the thrust face, and lower race notches on the periphery of the lower race so as to be locked into the bearing projections. This structure prevents the rolling elements from slipping instead of rotating, making the hermetic compressor more reliable.

The rolling elements of the thrust rolling bearing in the present invention have a higher surface hardness than the upper and lower races. This structure prevents the rolling elements from being worn earlier than the track surface of the upper and lower races, making the hermetic compressor more reliable.

The lubricating oil in the present invention has a viscosity of VG3 to VG8. This structure allows the sliding part to have low loss, making the hermetic compressor more efficient.

Industrial Applicability

As described hereinbefore, the hermetic compressor with a thrust ball bearing of the present invention has low noise level, high efficiency, and high reliability, and hence, can be applied not only to household electric fridge-freezers, but also to air conditioners, automatic selling machines, and other refrigerating devices.

The invention claimed is:

1. A hermetic compressor comprising:
an airtight container including:
  a motor element having a stator and a rotor; and
  a compression element driven by the motor element,
wherein the compression element includes:
  a shaft having a main shaft and an eccentric shaft, the rotor being fixed to the main shaft;
  a cylinder block having a compression space;
  a piston reciprocating in the compression space;
  a connection portion connecting the piston and the eccentric shaft;
  a main bearing in the cylinder block, the main bearing supporting the main shaft; and
  a thrust rolling bearing on a thrust face of the main bearing,
wherein the thrust rolling bearing includes:
  a plurality of rolling elements held in a holder;
  a upper race and a lower race arranged respectively on and beneath the rolling elements, wherein the upper and the lower race are annular shaped and an outer diameter of the upper race is smaller than an outer diameter of the lower race; and
  a support mechanism below the rolling elements, the support mechanism being elastic.

2. The hermetic compressor of claim 1,
wherein the plurality of rolling elements includes a plurality of balls such that the thrust rolling bearing is a thrust ball bearing.

3. The hermetic compressor of claim 1,
wherein the support mechanism is a support member arranged between the thrust face and one of the lower race and the upper race, the support member being elastic in a direction of gravity and being deformed in the direction of the gravity.

4. The hermetic compressor of claim 3,
wherein when a portion of the support member has a first elastic deformation, another portion thereof has a second elastic deformation that is smaller than the first elastic deformation so as to allow the thrust rolling bearing to be inclined with respect to the thrust face.

5. The hermetic compressor of claim 3, further comprising:
a movement restriction part for restricting the shaft from moving downward in the direction of gravity formed by a tubular extension portion of the main bearing that extends above the thrust face of the main bearing and the upper race,
wherein the upper race is arranged above the tubular extension portion at a predetermined distance.

6. The hermetic compressor of claim 3, further comprising:
a movement restriction part configured to restrict the shaft from moving downward in the direction of gravity before a load exceeding a withstand load is applied to the thrust rolling bearing.

7. The hermetic compressor of claim 3,
wherein the support member is an annular wave washer including:
a plurality of upward projections projecting toward and in contact with the lower race; and
a plurality of downward projections projecting toward and in contact with the thrust face,
wherein the upward projections and the downward projections are alternated in the circumferential direction.

8. The hermetic compressor of claim 7,
wherein the wave washer is formed of a plurality of identically-shaped wave washer members stacked on each other.

9. The hermetic compressor of claim 3,
wherein the support member is formed of a plurality of spaced apart elastic bodies arranged in a circumferential direction.

10. The hermetic compressor of claim 3,
wherein the support member is a flexible annular tube filled with a fluid.

11. The hermetic compressor of claim 1,
wherein the support mechanism is composed of the thrust face and the lower race placed thereon, the thrust face being arranged only on a side of a central axis of the main bearing with respect to a track of the rolling elements.

12. The hermetic compressor of claim 11,
wherein the thrust face has an outer diameter smaller than a diameter of a pitch circle of the rolling elements.

13. The hermetic compressor of claim 11, further comprising:
a rotation control part on a periphery of the thrust face, the rotation control part controlling rotation of the lower race.

14. The hermetic compressor of claim 13,
wherein the rotation control part includes:
a lower race projection on a periphery of the lower race in such a manner as to project in a radial direction; and
a bearing notch on a periphery of the thrust face, the bearing notch locking the lower race projection.

15. The hermetic compressor of claim 13,
wherein the rotation control part includes:
a bearing projection on a periphery of the thrust face; and
a lower race notch on the periphery of the lower race in such a manner as to be locked into the bearing projection.

16. The hermetic compressor of claim 1,
wherein the rolling elements of the thrust rolling bearing have a surface hardness higher than the upper race and the lower race.

17. The hermetic compressor of claim 1,
wherein the airtight container further includes lubricating oil for lubricating the compression element and the lubricating oil has a viscosity of VG3 to VG8.

18. The hermetic compressor of claim 5,
wherein when an amount of a downward displacement of the shaft becomes equal to a predetermined gap between the upper race and an end of the tubular extension portion, the upper race contacts the end of the tubular extension portion whereby the movement restriction part prevents the support member from being deformed greater than the predetermined gap.

19. The hermetic compressor of claim 12,
wherein the upper and the lower races are annular metal plates made of heat-treated spring steel, and an outer diameter of the upper race is smaller than an outer diameter of the lower race.

* * * * *